US009360226B2

(12) United States Patent
Honda

(10) Patent No.: US 9,360,226 B2
(45) Date of Patent: Jun. 7, 2016

(54) HEAT PUMP SYSTEM

(75) Inventor: Masahiro Honda, Ostend (BE)

(73) Assignees: Daikin Industries, Ltd., Osaka (JP); DAIKIN EUROPE N.V., Oostende (BE)

( * ) Notice: Subject to any disclaimer, the term of this patent is extended or adjusted under 35 U.S.C. 154(b) by 954 days.

(21) Appl. No.: 13/518,629

(22) PCT Filed: Dec. 28, 2009

(86) PCT No.: PCT/JP2009/007353
§ 371 (c)(1),
(2), (4) Date: Jun. 22, 2012

(87) PCT Pub. No.: WO2011/080802
PCT Pub. Date: Jul. 7, 2011

(65) Prior Publication Data
US 2012/0260685 A1 Oct. 18, 2012

(51) Int. Cl.
*F24F 3/06* (2006.01)
*F25B 7/00* (2006.01)
(Continued)

(52) U.S. Cl.
CPC ... *F24F 3/06* (2013.01); *F25B 7/00* (2013.01); *F25B 29/003* (2013.01);
(Continued)

(58) Field of Classification Search
CPC ............ F25B 2313/021; F25B 2313/0211; F25B 2313/0212; F25B 2313/0213; F25B 2313/0214; F25B 2313/0215; F25B 25/005; F25B 2313/006; F25B 2313/0231; F24F 2011/0045; F24F 3/065; F24F 3/06; F24F 2203/021; F24F 2221/54
USPC ............. 62/160, 222, 175, 324.1, 228.3, 132; 165/233; 236/92 B
See application file for complete search history.

(56) References Cited

U.S. PATENT DOCUMENTS 6,237,356 B1 * 5/2001 Hori ...................... F25B 25/005
62/238.4
2003/0010047 A1 * 1/2003 Shimoda ................. F25B 13/00
62/228.3
(Continued)

FOREIGN PATENT DOCUMENTS

JP 7-127929 A 5/1995
JP 2000-329424 A 11/2000
(Continued)

OTHER PUBLICATIONS

Machine Translation of Okazaki JP 2003-343936.*
(Continued)

*Primary Examiner* — Mohammad M Ali
*Assistant Examiner* — Meraj A Shaikh
(74) *Attorney, Agent, or Firm* — Global IP Counselors

(57) ABSTRACT

A heat pump system includes a heat-source-side refrigerant circuit and a controller. The heat-source-side refrigerant circuit has a plurality of usage units having usage-side heat exchangers. The plurality of usage units are connected to a heat source unit having a plurality of heat-source-side heat exchangers and a heat-source-side compressor configured to compress a heat-source-side refrigerant. The controller causes the plurality of heat-source-side heat exchangers to function as evaporators and radiators of heat-source-side refrigerant to perform an air-cooling operation and an air-warming operation using an aqueous medium. The heat pump system operates so that the heat-source-side condensing temperature is below 40° C. in the case that an outside air temperature is 25° C. or lower and the cooling and heating operations coexist.

9 Claims, 4 Drawing Sheets

(51) Int. Cl.
*F25B 13/00* (2006.01)
*F25B 30/00* (2006.01)
*F25B 29/00* (2006.01)
*F25B 25/00* (2006.01)

(52) U.S. Cl.
CPC .......... *F24F 2203/021* (2013.01); *F25B 13/00* (2013.01); *F25B 25/005* (2013.01); *F25B 2313/02743* (2013.01); *F25B 2400/06* (2013.01); *F25B 2600/02* (2013.01); *F25B 2600/13* (2013.01); *Y02B 30/745* (2013.01)

(56) References Cited

U.S. PATENT DOCUMENTS

| | | | |
|---|---|---|---|
| 2007/0000270 A1* | 1/2007 | Huang et al. .................... 62/272 | |
| 2009/0031740 A1* | 2/2009 | Douglas ................. F25B 13/00 62/225 | |
| 2010/0050675 A1* | 3/2010 | Kameyama et al. ......... 62/238.7 | |
| 2011/0088421 A1 | 4/2011 | Wakamoto et al. | |

FOREIGN PATENT DOCUMENTS

| | | | | |
|---|---|---|---|---|
| JP | 2002-106995 A | | 4/2002 | |
| JP | 2003-343936 | * | 12/2003 | |
| JP | 2003-343936 A | | 12/2003 | |
| JP | 2003343936 A | * | 12/2003 | |
| JP | 2006-343052 A | | 12/2006 | |
| JP | WO 2008117408 A1 | * | 10/2008 | ............ F24D 17/001 |
| WO | WO 2008117408 | * | 2/2008 | |
| WO | 2008/117408 A1 | | 10/2008 | |
| WO | WO-2009/122476 A1 | | 10/2009 | |
| WO | 2009/133640 A1 | | 11/2009 | |

OTHER PUBLICATIONS

European Search Report of corresponding EP Application No. 09 84 5950.6 dated Jul. 25, 2013.
International Preliminary Report of corresponding PCT Application No. PCT/JP2009/007353.
International Search Report of corresponding PCT Application No. PCT/JP2009/007353.

* cited by examiner

HEAT PUMP SYSTEM

TECHNICAL FIELD

The present invention relates to a heat pump system, and particularly relates to a heat pump system configured by connecting a plurality of usage units for performing an aqueous medium cooling or heating operation to a heat source unit having a plurality of heat-source-side heat exchangers, and the heat pump system being capable of simultaneous cooling and heating operations.

BACKGROUND ART

Japanese Laid-open Patent Application No. 2006-343052 is a conventional air-conditioning apparatus. The air-conditioning apparatus (heat pump system) has a plurality of indoor units (usage units) having an indoor heat exchanger (usage-side heat exchanger) that are connected to an outdoor unit (heat source unit) having a compressor, and first and second indoor heat exchangers (a plurality of heat-source-side heat exchangers). The heat pump system is capable of simultaneous air-cooling operation (cooling operation) and air-warming operation (heating operation). More specifically, in a state in which the cooling operation or heating operation has been set for each usage unit, the heat pump system causes a plurality of heat-source-side heat exchangers to function as a refrigerant evaporator or a refrigerant radiator in accordance with the heat load of the entire plurality of usage units, and is capable of carrying out operation for balancing the heat load of the entire plurality of usage units.

SUMMARY

In a conventional heat pump system, there is a tendency for the heat load of the entire plurality of usage units to be reduced when the system has both a usage unit for performing cooling operation and a usage unit for performing heating operation. Accordingly, the heat load required by a plurality of heat-source-side heat exchangers is reduced; and a portion of the plurality of heat-source-side heat exchangers must be made to function as refrigerant radiators and the remaining heat-source-side heat exchangers must be made to function as refrigerant evaporators. Also, the condensing temperature that corresponds to the saturation temperature of the refrigerant must be kept at a predetermined temperature or higher in the heat-source-side heat exchanger and/or the usage-side heat exchanger, which function as refrigerant radiators, in order to perform heating operation. In other words, in a mixed cooling and heating operation, a portion of the plurality of heat-source-side heat exchangers are made to function as a refrigerant radiators, the remaining heat-source-side heat exchangers are made to function as refrigerant evaporators while the condensing temperature is maintained, and the heat load of the entire plurality of usage units must be balanced.

However, the operation for balancing the heat load of the entire plurality of usage units by using the plurality of heat-source-side heat exchangers entails increasing the operating capacity of the compressor regardless of whether the heat load required by the plurality of heat-source-side heat exchanger is low. Accordingly, there is a problem in that the power consumption of the compressor is increased and the operating efficiency is reduced. Under low outside air temperature conditions, there is a tendency for the heat radiation capability of the heat-source-side heat exchanger that functions as a refrigerant radiator to be increased. Therefore, there is a problem in that it is difficult to balance the heat load of the entire plurality of usage units by using a plurality of heat-source-side heat exchangers. The condensing temperature during heating operation must be kept at about 50° C. or higher in the particular case that the aqueous medium is cooled together with refrigerant evaporation by heat exchange between the refrigerant and the aqueous medium during cooling operation, and a usage unit having a usage-side heat exchanger is used for heating the aqueous medium together with refrigerant heat radiation by using heat exchange between the refrigerant and the aqueous medium during heating operation. For this reason, the trend has been to increase the heat radiation capability of the heat-source-side heat exchangers that function as a refrigerant radiator, and the problem of reduced operating efficiency is more pronounced in the case that the outside temperature is low and cooling and heating operations coexist in a configuration that uses a usage unit having a usage-side heat exchanger for cooling and heating an aqueous medium.

An object of the present invention is to make good efficiency operation possible in a heat pump system configured by connecting a plurality of usage units for performing an aqueous medium cooling or heating operation, and the heat pump system being capable of simultaneous cooling and heating operations, even under low outside air temperature and cooling and heating operations coexist conditions.

A heat pump system according to a first aspect of the present invention has a heat-source-side refrigerant circuit and a controller. The heat-source-side refrigerant circuit is composed of a plurality of usage units having usage-side heat exchangers connected to a heat source unit having a plurality of heat-source-side heat exchangers and a heat-source-side compressor for compressing a heat-source-side refrigerant. The controller is capable of causing the plurality of heat-source-side heat exchangers to function as evaporators of the heat-source-side refrigerant and radiators of the heat-source-side refrigerant, and carrying out operation for balancing the heat load of all of the plurality of usage units, in accordance with the heat load of all of the plurality of usage units, in a state in which a cooling operation or heating operation is set for each of the usage units, the cooling operation being used for cooling an aqueous medium by using the evaporation of the heat-source-side refrigerant in the usage-side heat exchangers, and the heating operation being used for heating the aqueous medium by using the heat radiation of the heat-source-side refrigerant in the usage-side heat exchangers. The usage units furthermore have usage-side refrigerant circuits having usage-side compressors for compressing a usage-side refrigerant, the usage-side compressors being connected to refrigerant/water heat exchangers for heating an aqueous medium by heat exchange between the usage-side refrigerant and the aqueous medium. The usage-side refrigerant circuits are configured so that, during the heating operation, the refrigerant/water heat exchangers function as heat radiators of the usage-side refrigerant, and the usage-side heat exchangers function as evaporators of the usage-side refrigerant and radiators of the heat-source-side refrigerant. The controller operates so that the heat-source-side condensing temperature, which corresponds to a saturation temperature of the heat-source-side refrigerant in the heat-source-side heat exchangers functioning as the heat-source-side refrigerant radiators, will be below 40° C. in the case that an outside air temperature is 25° C. or lower and the cooling and heating operations coexist.

Under low outside air temperature conditions; i.e., 25° C. or lower, the temperature difference with the heat-source-side condensing temperature (about 50° C. or higher) is 25° C. or higher. Accordingly, in the case that cooling and heating operations coexist, there is a pronounced tendency for the heat radiation capacity of the heat-source-side heat exchangers that function as radiators of the heat-source-side refrigerant to increase, and it is difficult to control the heat radiation capacity of the heat-source-side heat exchangers that function as radiators of the heat-source-side refrigerant. The tendency toward increasing the heat radiation capacity of the heat-source-side heat exchangers that function as radiators of the heat-source-side refrigerant can be suppressed and control is facilitated by reducing the heat-source-side condensing temperature, but conversely, it is difficult to keep the heat-source-side condensing temperature at about 50° C. or higher and to sufficiently heat the aqueous medium.

Thus, it is difficult to both control the heat radiation capacity of the heat-source-side heat exchangers, which function as radiators of the heat-source-side refrigerant, and maintain the heat-source-side condensing temperature for heating operation, in the case that the outside air temperature is 25° C. or lower and the cooling and heating operations coexist.

In view of the above, with the heat pump system as described above, the usage units are provided with usage-side compressor and refrigerant/water heat exchangers, and the usage units furthermore have usage-side refrigerant circuits in which the usage-side heat exchangers function as evaporators of the usage-side refrigerant and function as radiators of the heat-source-side refrigerant.

Thereby, with the heat pump system, the aqueous medium can be heated during the heating operation by a dual refrigeration cycle composed of a heat-source-side refrigerant circuit and usage-side refrigerant circuits. Accordingly, the condensing temperature of the usage-side refrigerant used for heat exchange with the aqueous medium can be increased in the refrigerant/water heat exchangers, even when the heat-source-side condensing temperature of the heat-source-side refrigerant sent to the usage-side heat exchangers is low. In other words, with the heat pump system, the aqueous medium is heated during the heating operation by the dual refrigeration cycle composed of a heat-source-side refrigerant circuit and usage-side refrigerant circuits. Therefore, the heat-source-side condensing temperature of the heat-source-side refrigerant sent to the usage-side heat exchangers can be reduced.

For this reason, with this heat pump system, the heat-source-side condensing temperature is no longer required to be kept at about 50° C. or higher, and operation can be performed so that the heat-source-side condensing temperature is below 40° C., even in the case that the outside air temperature is 25° C. or lower and cooling and heating operations coexist. When the heat-source-side condensing temperature is brought to below 40° C., the temperature difference between the outside air temperature (e.g., 25° C.) and the heat-source-side condensing temperature (below 40° C.) is less than 15° C., and the temperature difference can be kept to about half the temperature difference (25° C.) of the case in which the heat-source-side condensing temperature is about 50° C. Therefore, the heat radiation capability of the heat-source-side heat exchangers which function as radiators of the heat-source-side heat exchanger refrigerant can be considerably reduced, and it becomes easier to balance the heat load of the entire plurality of usage units while carrying out the desired air-warming operation. Since it is possible to suppress an increase in the operating capacity of the heat-source-side compressor, an increase in the power consumption of the heat-source-side compressor can be reduced and operation can take place with good efficiency.

A heat pump system according to a second aspect of the present invention is the heat pump system according to the first aspect of the present invention, wherein the usage-side heat exchangers have first usage-side heat exchangers and second usage-side heat exchangers. The first usage-side heat exchangers are heat exchangers that function as an evaporator of the usage-side refrigerant and as a radiator of the heat-source-side refrigerant during the heating operation. The second usage-side heat exchangers are heat exchangers for cooling the aqueous medium by exchanging heat between the heat-source-side refrigerant and the aqueous medium during the cooling operation. The usage-side refrigerant circuits are configured by connecting the usage-side compressors, the refrigerant/water heat exchangers, and the first usage-side heat exchangers.

According to the above heat pump system, the usage-side heat exchangers are divided into first usage-side heat exchangers for heating operation and second usage-side heat exchangers for cooling operation. Accordingly, the structure of the heat exchangers in the above heat pump system can be made simpler than, e.g., that of a usage-side heat exchanger configured so as to be able to deliver a heat-source-side refrigerant, a usage-side refrigerant, and an aqueous medium.

A heat pump system according to a third aspect of the present invention is the heat pump system according to the second aspect of the present invention, wherein the usage units are capable of simultaneously carrying out the heating operation and cooling operation. The heating operation is an operation for heating the aqueous medium by heat radiation of the heat-source-side refrigerant in the first usage-side heat exchangers and by operation of the usage-side refrigerant circuits. The cooling operation is an operation for cooling the aqueous medium by evaporation of the heat-source-side refrigerant in the second usage-side heat exchangers.

According to the above heat pump system, the usage units are capable of simultaneous heating and cooling operations. Therefore, it is possible to simultaneously perform, e.g., indoor air-cooling using the cooling operation and hot-water supply using the heating operation, Accordingly, the heat pump system is effective in residential complexes or the like in which hot-water supply and air-cooling are performed simultaneously A heat pump system according to a fourth aspect of the present invention is the heat pump system according to the third aspect of the present invention, wherein the refrigerant/water heat exchangers are connected to hot-water storage tanks. The hot-water storage tanks are tanks for storing the aqueous medium heated in the refrigerant/water heat exchangers, or the aqueous medium heated by exchanging heat with the aqueous medium heated in the refrigerant/water heat exchanger. The controller performs the heating operation in the case that hot-water storage temperatures, which are the temperatures of the aqueous medium stored in the hot-water storage tanks during the cooling operation, are at predetermined hot-water storage temperature settings or lower.

According to the above heat pump system, heating operation is performed in the case that the hot-water storage temperatures have reached or fallen below predetermined hot-water storage temperature settings during the cooling operation. For this reason, with this heat pump system, the hot-water storage temperatures can be kept at hot-water storage temperature settings or higher while efficiently using the heat obtained by the heat-source-side refrigerant by cooling the aqueous medium in the cooling operation.

A heat pump system according to a fifth aspect of the present invention is the heat pump system according to any of the first to fourth aspects of the present invention, wherein the heat-source-side compressor is a variable-capacity compressor. The controller controls the operating capacity of the heat-source-side compressor so that the heat-source-side condensing temperature reaches a predetermined target heat-source-side condensing temperature. The controller sets the target heat-source-side condensing temperature to below 40° C. in the case that that the outside air temperature is 25° C. or lower and the cooling and heating operations coexist.

According to the above heat pump system, an operation is performed to bring the heat-source-side condensing temperature to below 40° C. by controlling the operating capacity of the heat-source-side compressor, in the case that the outside air temperature is 25° C. or lower and the cooling and heating operations coexist. In this configuration, the operating capacity of the heat-source-side compressor is controlled so that the heat-source-side condensing temperature reaches a target heat-source-side condensing temperature. Therefore, the heat-source-side condensing temperature can be stabilized at lower than 40° C. by setting the target heat-source-side condensing temperature to be lower than 40° C.

A heat pump system according to a sixth aspect of the present invention is the heat pump system according to the fifth aspect of the present invention, wherein the heat source unit further has variable-airflow heat-source-side fan for feeding air as a cooling source or a heat source for the plurality of heat-source-side heat exchangers, The controller controls the operating airflow rate of the heat-source-side fan so that the heat-source-side condensing temperature reaches the target heat-source-side condensing temperature in the case that the outside air temperature is 25° C. or lower and the cooling and heating operations coexist.

According to the above heat pump system, operation is performed to bring the heat-source-side condensing temperature to below 40° C. by controlling the operating capacity of the heat-source-side compressor and by controlling the operating airflow rate of the heat-source-side fan, in the case that that the outside air temperature is 25° C. or below and the cooling and heating operations coexist. Accordingly, operation can be performed with even better efficiency because the heat-radiating capacity of the heat-source-side heat exchangers can be even further suppressed.

A heat pump system according to a seventh aspect of the present invention is the heat pump system according to any of the first to sixth aspects of the present invention, wherein the controller intermittently performs the cooling operation in predetermined cases. The predetermined cases are that the outside air temperature is 10° C. or lower and the cooling and heating operations coexist; that heat-source-side heat exchangers that function as evaporators of the heat-source-side refrigerant are present; and that the heat-source-side evaporation temperature has reached or fallen below a predetermined lower-limit evaporation temperature. The heat-source-side evaporation temperature is a temperature that corresponds to the saturation temperature of the heat-source-side refrigerant in the heat-source-side heat exchangers functioning as evaporators of the heat-source-side refrigerant.

The heat-source-side evaporation temperature tends to reach 0° or lower in the case that the outside air temperature is 10° C. or lower and the cooling and heating operations coexist, and that heat-source-side heat exchangers that function as evaporators of the heat-source-side refrigerant are present. The temperature of the heat-source-side refrigerant that flows through the usage-side heat exchangers for performing cooling operation is also liable to reach 0° C. or lower, and the aqueous medium cooled by evaporation of the heat-source-side refrigerant in the usage-side heat exchangers may freeze. In response to this situation, it is possible to consider providing a pressure adjustment valve in order to prevent a reduction in the pressure of the heat-source-side refrigerant at the outlet of the heat-source-side refrigerant of the usage-side heat exchangers that are performing cooling operation. However, operation with good efficiency may be compromised by pressure drop of the pressure adjustment valve.

In view of this situation, with the heat pump system, cooling operation is performed intermittently in the case that outside air temperature is 10° C. or lower and the cooling and heating operations coexist; that heat-source-side heat exchangers that function as evaporators of the heat-source-side refrigerant are present; and that the heat-source-side evaporation temperature has reached a predetermined lower limit evaporation temperature or less as described above.

Therefore, with this heat pump system, cooling operation can be performed while suppressing a loss of efficiency and reducing freezing of the aqueous medium.

A heat pump system according to an eighth aspect of the present invention is the heat pump system according to any of the first to seventh aspects of the present invention, wherein usage-side heat exchanger outlet on-off valves, which are closed when the cooling operation is not being performed and are opened when the cooling operation is being performed, are provided to outlets of the heat-source-side refrigerant during the cooling operation of the usage-side heat exchangers.

The heat-source-side evaporation temperature, which corresponds to the saturation temperature of the heat-source-side refrigerant in the heat-source-side heat exchangers functioning as refrigerant evaporators, tends to become very low in the case that the outside temperature is low and heat-source-side heat exchangers that function as evaporators of the heat-source-side refrigerant are present. Accordingly, the heat-source-side refrigerant inside the usage-side heat exchangers tends to reach a low temperature when cooling operation is not performed, and the aqueous medium may be cooled and freeze.

In view of this situation, according to the above heat pump system, usage-side heat exchanger outlet on-off valves, which are off when the cooling operation is not being performed and are on when the cooling operation is being performed, are provided to the outlets of the heat-source-side refrigerant during the cooling operation of the usage-side heat exchangers as described above.

It is thereby possible to ensure that the heat-source-side refrigerant of the usage-side heat exchangers does not fall to a low temperature when cooling operation is not being performed, and freezing of the aqueous medium can be suppressed. A heat pump system according to a ninth aspect of the present invention is the heat pump system according to any of the first to eighth aspects of the present invention, wherein the heating operation is capable of heating the aqueous medium to 65° C. or higher.

This heat pump system is useful in radiators or other applications that require hot water or another high-temperature aqueous medium.

DESCRIPTION OF EMBODIMENTS

Embodiments of the heat pump system according to the present invention are described below with reference to the drawings.

(1) First Embodiment
<Configuration>
—Overall Configuration—

Figure 1:
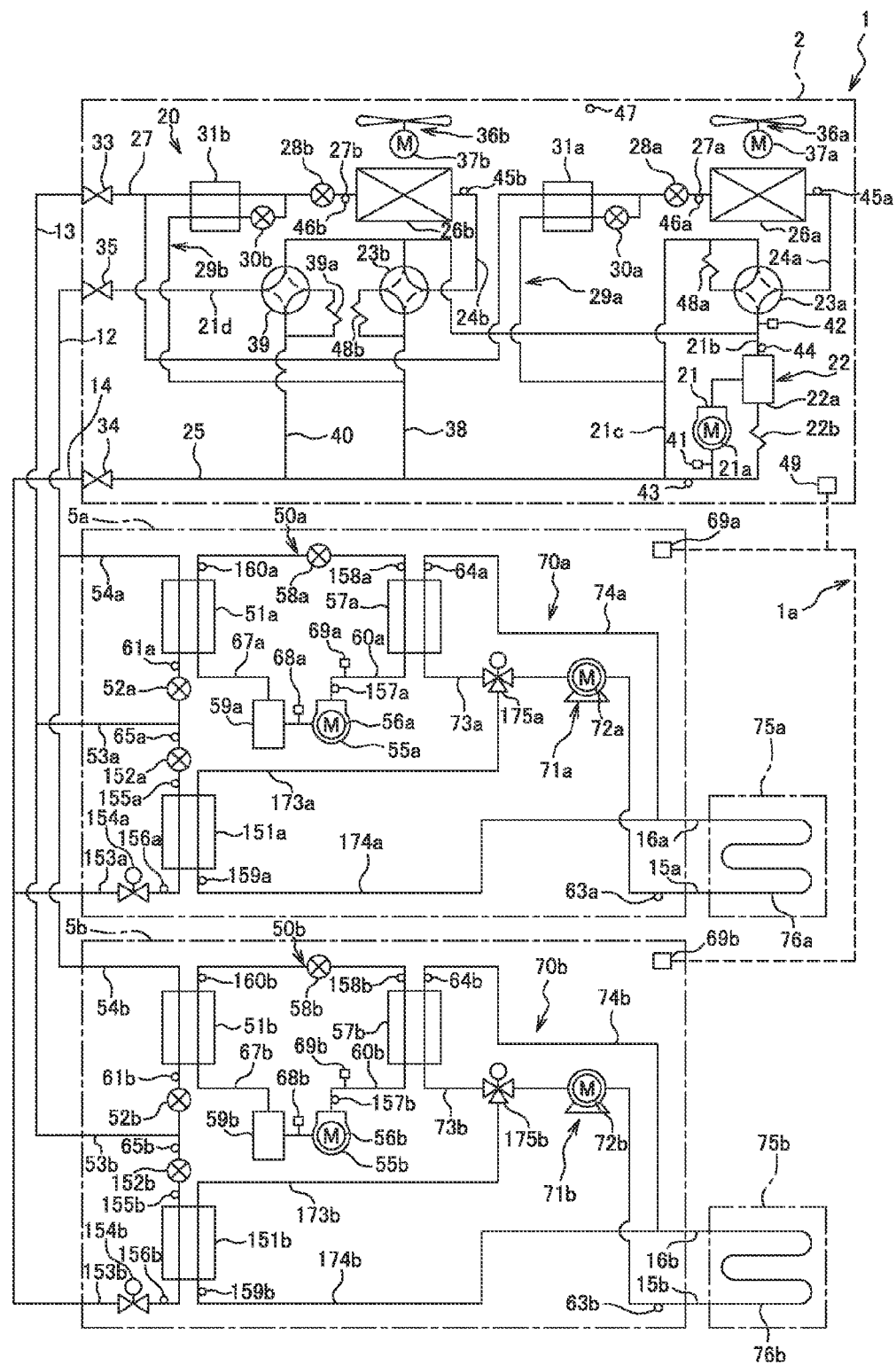
FIG. 1 is a schematic structural diagram of the heat pump system according to the first embodiment of the present invention.

FIG. 1 is a schematic structural diagram of the heat pump system 1 according to the first embodiment of the present invention. The heat pump system 1 is an apparatus capable of an air-cooling operation (cooling operation) and an air-warming operation (heating operation) using a vapor compression heat pump cycle.

The heat pump system 1 mainly has a heat source unit 2, a plurality (two in FIG. 1) of usage units 5a, 5b, a discharge refrigerant communication tube 12, a liquid-refrigerant communication tube 13, an intake refrigerant communication tube 14, aqueous medium air-cooling/air-heating units 75a, 75b (aqueous medium usage apparatuses), and aqueous medium communication tubes 15a, 16a, 15b, 16b. The heat source unit 2 and usage units 5a, 5b are made into a heat-source-side refrigerant circuit 20 by being connected via the refrigerant communication tubes 12, 13, 14. The usage units 5a, 5b constitute usage-side refrigerant circuits 50a, 50b. The usage units 5a, 5b and the aqueous medium air-cooling/air-heating units 75a, 75b are made into aqueous medium circuits 70a, 70b by being connected via the aqueous medium communication tubes 15a, 16a, 15b, 16b. HFC-410A, which is a type of RFC-based refrigerant, is enclosed inside the heat-source-side refrigerant circuit 20 as a heat-source-side refrigerant. HFC-134a, which is a type of HFC-based refrigerant, is enclosed inside the usage-side refrigerant circuits 50a, 50b as a usage-side refrigerant. The usage-side refrigerant is preferably one in which the pressure that corresponds to a saturated gas temperature of 65° C. is a maximum gauge pressure of 2.8 MPa or less, and is more preferably a refrigerant of 2.0 MPa or less from the viewpoint of using a refrigerant that is advantageous for a high-temperature refrigeration cycle. HFC-134a is a type of refrigerant having such saturation pressure characteristics. Water is circulated as the aqueous medium in the aqueous medium circuits 70a, 70b.

—Heat Source Unit—

The heat source unit 2 is disposed outdoors (e.g., on the roof or the like of buildings and residential complexes). The heat source unit 2 is connected to the usage units 5a, 5b via the refrigerant communication tubes 12, 13, 14 and constitutes a portion of the heat-source-side refrigerant circuit 20.

The heat source unit 2 mainly has a heat-source-side compressor 21, an oil separation mechanism 22, a first heat-source-side switching mechanism 23a, a second heat-source-side switching mechanism 23b, a first heat-source-side heat exchanger 26a, a second heat-source-side heat exchanger 26b, a first heat-source-side expansion valve 28a, a second heat-source-side expansion valve 28b, a first intake return tube 29a, a second intake return tube 29b, a first subcooler 31a, a second subcooler 31b, a liquid-side closing valve 33, an intake-side closing valve 34, a discharge-side closing valve 35, and a third heat-source-side switching mechanism 39.

The heat-source-side compressor 21 is a mechanism for compressing the heat-source-side refrigerant. In this configuration, the heat-source-side compressor 21 has a rotary element, scroll element, or other type of positive displacement compression element (not shown) accommodated in a casing (not shown), and the compression element is a hermetic compressor driven by a heat-source-side compressor motor 21a accommodated in the same casing. The rotational speed (i.e., operational frequency) of the heat-source-side compressor motor 21a can be varied by using an inverter device (not shown), whereby the capacity of the heat-source-side compressor 21 can be controlled.

The oil separation mechanism 22 is a mechanism for separating and returning the refrigeration machine oil contained in the heat source refrigerant discharged from the heat-source-side compressor 21 to the heat-source-side compressor 21. The oil separation mechanism 22 mainly has an oil separator 22a provided to a heat-source-side discharge tube 21b of the heat-source-side compressor 21, and an oil return tube 22b for connecting the oil separator 22a and a heat-source-side intake tube 21c of the heat-source-side compressor 21. The oil separator 22a is an apparatus for separating the refrigeration machine oil contained in the heat-source-side refrigerant discharged from the heat-source-side compressor 21. The oil return tube 22b has a capillary tube and is a refrigerant tube for returning the refrigeration machine oil separated out from the heat-source-side refrigerant in the oil separator 22a to the heat-source-side intake tube 21c of the heat-source-side compressor 21. A heat-source-side gas-refrigerant tube 25 is connected to the heat-source-side intake tube 21c. The heat-source-side gas-refrigerant tube 25 is a refrigerant tube for introducing heat-source-side refrigerant from the exterior of the heat source unit 2 (more specifically, the intake refrigerant communication tube 14) to the intake of the heat-source-side compressor 21.

The first heat-source-side switching mechanism 23a is a four-way switching valve capable of switching between a first heat-source-side heat-radiation operating state for causing the first heat-source-side heat exchanger 26a to function as a radiator of the heat-source-side refrigerant, and a first heat-source-side evaporation operating state for causing the first heat-source-side heat exchanger 26a to function as an evaporator of the heat-source-side refrigerant. The first heat-source-side switching mechanism 23a is connected to the heat-source-side discharge tube 21b, the heat-source-side intake tube 21c, and a first heat-source-side gas-refrigerant tube 24a connected to the gas side of the first heat-source-side heat exchanger 26a. One of the four ports of the first heat-source-side switching mechanism 23a is in communication with the heat-source-side intake tube 21c by way of a capillary tube 48a, whereby the first heat-source-side switching mechanism 23a functions as a three-way switching valve. The first heat-source-side switching mechanism 23a is capable of switching (corresponding to the first heat-source-side heat-radiation operating state; see the solid tines of the first heat-source-side switching mechanism 23a of FIG. 1) so as to place the heat-source-side discharge tube 21b and the first heat-source-side gas-refrigerant tube 24a in communication. The first heat-source-side switching mechanism 23a is also capable of switching (corresponding to the first heat-source-side evaporation operating state; see the broken lines of the first heat-source-side switching mechanism 23a of FIG. 1) so as to place the first heat-source-side gas-refrigerant tube 24a and the heat-source-side intake tube 21c in communication. The first heat-source-side switching mechanism 23a is not limited to being a four-way switching valve, but may also be, e.g., a configuration in which a plurality of solenoid valves are used in combination to achieve a function similar to that described above for switching the direction of flow of the heat-source-side refrigerant.

The second heat-source-side switching mechanism 23b is a four-way switching valve capable of switching between a second heat-source-side heat-radiation operating state for causing the second heat-source-side heat exchanger 26b to function as a radiator of the heat-source-side refrigerant, and a second heat-source-side evaporation operating state for causing the second heat-source-side heat exchanger 26b to function as an evaporator of the heat-source-side refrigerant. The second heat-source-side switching mechanism 23b is connected to the heat-source-side discharge tube 21b, the heat-source-side intake tube 21c (more specifically, a communication tube 38 in communication with the heat-source-side gas-refrigerant tube 25 and the heat-source-side intake tube 21c), and a second heat-source-side gas-refrigerant tube 24b connected to the gas side of the second heat-source-side heat exchanger 26b. In other words, the heat-source-side discharge tube 21b is a branching tube connected to the first heat-source-side switching mechanism 23a as well as the second heat-source-side switching mechanism 23b. One of the four ports of the second heat-source-side switching mechanism 23b is in communication with the communication tube 38 by way of a capillary tube 48b, whereby the second heat-source-side switching mechanism 23b functions as a three-way switching valve. The second heat-source-side switching mechanism 23b is capable of switching (corresponding to the second heat-source-side heat-radiation operating state; see the solid lines of the second heat-source-side switching mechanism 23b of FIG. 1) so as to place the heat-source-side discharge tube 21b and the second heat-source-side gas-refrigerant tube 24b in communication. The second heat-source-side switching mechanism 23b is also capable of switching (corresponding to the second heat-source-side evaporation operating state; see the broken lines of the second heat-source-side switching mechanism 23b of FIG. 1) so as to place the second heat-source-side gas-refrigerant tube 24b and the heat-source-side intake tube 21c in communication. The second heat-source-side switching mechanism 23b is not limited to being a four-way switching valve, but may also be, e.g., a configuration in which a plurality of solenoid valves are used in combination to achieve a function similar to that described above for switching the direction of flow of the heat-source-side refrigerant.

The third heat-source-side switching mechanism 39 is a four-way switching valve provided to a heat-source-side discharge branching tube 21d branched from the heat-source-side discharge tube 21b. The third heat-source-side switching mechanism 39 is a four-way switching valve capable of switching between a simultaneous air-cooling/warming operating state for constituting the heat pump system in which the heat source unit 2 is capable of simultaneous air-cooling/warming operation, and an air-cooling/warming-switchable operating state for constituting the heat pump system in which the heat source unit 2 is capable of switching between air-cooling and air-warming operation. The third heat-source-side switching mechanism 39 is connected to the heat-source-side discharge branching tube 21d, the heat-source-side intake tube 21c (more specifically; a communication tube 40 in communication with the heat-source-side gas-refrigerant tube 25 and the heat-source-side intake tube 21c). One of the four ports of the third heat-source-side switching mechanism 39 is in communication with the communication tube 40 by way of a capillary tube 39a, whereby the third heat-source-side switching mechanism 39 functions as a three-way switching valve. The third heat-source-side switching mechanism 39 is capable of switching corresponding to the simultaneous air-cooling/warming operation state; see the solid lines of the third heat-source-side switching mechanism 39 of FIG. 1) the heat-source-side discharge branching tube 21d from discharge of the heat-source-side compressor 21 and causing the heat-source-side discharge branching tube to function as a refrigerant tube for drawing out the heat-source-side refrigerant to the exterior of the heat source unit 2 (more specifically, the discharge refrigerant communication tube 12), regardless of the switching operation of the first and second heat-source-side switching mechanisms 23a, 23b. The third heat-source-side switching mechanism 39 is capable of switching (corresponding to the air-cooling/warming-switchable operating state; see the broken lines of the third heat-source-side switching mechanism 39 of FIG. 1) the heat-source-side discharge branching tube 21d from discharge of the heat-source-side compressor 21 and causing the heat-source-side discharge branching tube to function as a refrigerant tube for drawing out the heat-source-side refrigerant to the exterior of the heat source unit 2, and as a refrigerant tube for introducing the heat-source-side refrigerant from the exterior of the heat source unit 2 to the intake of the heat-source-side compressor 21, in accordance with the switching operation of the first and second heat-source-side switching mechanisms 23a, 23b. The third heat-source-side switching mechanism 39 is not limited to being a four-way switching valve, but may also be, e.g., a configuration in which a plurality of solenoid valves are used in combination to achieve a function similar to that described above for switching the direction of flow of the heat-source-side refrigerant.

The first heat-source-side heat exchanger 26a is a heat exchanger that functions as a radiator or an evaporator of the heat-source-side refrigerant by exchanging heat between the heat-source-side refrigerant and the outdoor air, a first heat-source-side liquid-refrigerant tube 27a is connected to the liquid side of the first heat-source-side heat exchanger, and the first heat-source-side gas-refrigerant tube 24a is connected to the gas side of the first heat-source-side heat exchanger. The first heat-source-side liquid-refrigerant tube 27a is a refrigerant tube for drawing out the heat-source-side refrigerant from the outlet of the first heat-source-side heat exchanger 26a, which functions as a radiator of the heat-source-side refrigerant, to a heat-source-side liquid-refrigerant junction tube 27. The first heat-source-side liquid-refrigerant tube 27a is a refrigerant tube for introducing the heat-source-side refrigerant from the heat-source-side liquid-refrigerant junction tube 27 to the inlet of the first heat-source-side heat exchanger 26a, which functions as an evaporator of the heat-source-side. The outdoor air for exchanging heat with the heat-source-side refrigerant in a first heat-source-side heat exchanger 26 is fed by a first heat-source-side fan 36a driven by a first heat-source-side fan motor 37a. The rotational speed (i.e., operational frequency) of the first heat-source-side fan motor 37a can be varied by using an inverter device (not shown), whereby the airflow rate of the first heat-source-side fan 36a can be controlled.

The first heat-source-side expansion valve 28a is an electrically driven expansion valve for depressurization or the like of the heat-source-side refrigerant that flows through the first heat-source-side heat exchanger 26a, and is provided to the first heat-source-side liquid-refrigerant tube 27a.

The first intake return tube 29a is a refrigerant tube that branches and returns a portion of the heat-source-side refrigerant that flows through the first heat-source-side liquid-refrigerant tube 27a to the intake of the heat-source-side compressor 21. In this configuration, one end of the first intake return tube is connected to the first heat-source-side liquid-refrigerant tube 27a and the other end is connected to the heat-source-side intake tube 21c. A first intake-return expansion valve 30a capable of opening degree control is provided to the first intake return tube 29a. The first intake-return expansion valve 30a is composed of an electrically driven expansion valve.

The first subcooler 31a. is a heat exchanger for exchanging heat between the refrigerant that flows through the first heat-source-side liquid-refrigerant tube 27a and the heat-source-side refrigerant (more specifically, the heat-source-side refrigerant depressurized by the first intake-return expansion valve 30a) that flows through the first intake return tube 29a.

The second heat-source-side heat exchanger 26b is a heat exchanger for functioning as a radiator or an evaporator of the heat-source-side refrigerant by exchanging heat between the heat-source-side refrigerant and the outdoor air, a second heat-source-side liquid-refrigerant tube 27b is connected to the liquid side of the second heat-source-side heat exchanger, and the second heat-source-side gas-refrigerant tube 24b is connected to the gas side of the second heat-source-side heat exchanger. The second heat-source-side liquid-refrigerant tube 27b is a refrigerant tube for drawing out the heat-source-side refrigerant from the outlet of the second heat-source-side heat exchanger 26b, which functions as a radiator of the heat-source-side refrigerant, to the heat-source-side liquid-refrigerant junction tube 27. The second heat-source-side liquid-refrigerant tube 27b is a refrigerant tube for introducing the heat-source-side refrigerant from the heat-source-side liquid-refrigerant junction tube 27 to the inlet of the second heat-source-side heat exchanger 26b, which functions as an evaporator of the heat-source-side refrigerant. In other words, the first heat-source-side liquid-refrigerant tube 27a and the second heat-source-side liquid-refrigerant tube 27b are refrigerant tubes branched from the heat-source-side liquid-refrigerant junction tube 27. The heat-source-side liquid-refrigerant junction tube 27 is a refrigerant tube for drawing out the heat-source-side refrigerant from the junction portion of the first heat-source-side liquid-refrigerant tube 27a and the second heat-source-side liquid-refrigerant tube 27b to the exterior of the heat source unit 2 (more specifically, the liquid-refrigerant communication tube 13). The heat-source-side liquid-refrigerant junction tube 27 is a refrigerant tube for introducing the heat-source-side refrigerant from the exterior of the heat source unit 2 to the junction portion of the first heat-source-side liquid-refrigerant tube 27a and the second heat-source-side liquid-refrigerant tube 27b, The outdoor air for exchanging heat with the heat-source-side refrigerant in the second heat-source-side heat exchanger 26b is fed by a second heat-source-side fan 36b driven by a second heat-source-side fan motor 37b. The rotational speed (i.e., operational frequency) of the second heat-source-side fan motor 37b can be varied by using an inverter device not shown), whereby the airflow rate of the second heat-source-side fan 36b can be controlled.

The second heat-source-side expansion valve 28b is an electrically driven expansion valve for depressurized or the like of the heat-source-side refrigerant that flows through the second heat-source-side heat exchanger 26b, and is provided to the second heat-source-side liquid-refrigerant tube 27b.

The second intake return tube 29b is a refrigerant tube that branches and returns a portion of the heat-source-side refrigerant that flows through the second heat-source-side liquid-refrigerant tube 27b to the intake of the heat-source-side compressor 21. In this configuration, one end of the second intake return tube is connected to the second heat-source-side liquid-refrigerant tube 27b and the other end is connected to the heat-source-side intake tube 21c. A second intake-return expansion valve 30b capable of opening degree control is provided to the second intake return tithe 29b. The second intake-return expansion valve 30b is composed of an electrically driven expansion valve.

The second subcooler 31b is a heat exchanger for exchanging heat between the refrigerant that flows through the second heat-source-side liquid-refrigerant tithe 27b and the heat-source-side refrigerant (more specifically, the heat-source-side refrigerant depressurized by the second intake-return expansion valve 30b) that flows through the second intake return tube 29b.

The liquid-side closing valve 33 is a valve provided to the connecting portion between the heat-source-side liquid-refrigerant junction tube 27 and the liquid-refrigerant communication tube 13. The intake-side closing valve 34 is a valve provided to the connecting portion between the heat-source-side gas-refrigerant tube 25 and the intake refrigerant communication tube 14. The discharge-side closing valve 35 is a valve provided to the connecting portion between the heat-source-side discharge branching tube 21d and the discharge refrigerant communication tube 12.

Various types of sensors are provided to the heat source unit 2. Specifically, the heat source unit 2 is provided with a heat-source-side intake pressure sensor 41, a heat-source-side discharge pressure sensor 42, a heat-source-side intake temperature sensor 43, a heat-source-side discharge temperature sensor 44, first and second heat-source-side heat exchange gas-side temperature sensors 45a, 45b, first and second heat-source-side heat exchange liquid-side temperature sensors 46a, 46b, and an outside-air temperature sensor 47. The heat-source-side intake pressure sensor 41 is a pressure sensor for detecting the heat-source-side intake pressure Ps1, which is the pressure of the heat-source-side refrigerant in the intake of the heat-source-side compressor 21. The heat-source-side discharge pressure sensor 42 is a pressure sensor for detecting the heat-source-side discharge pressure Pd1, which is the pressure of the heat-source-side refrigerant in the discharge of the heat-source-side compressor 21. The heat-source-side intake temperature sensor 43 is a temperature sensor for detecting the heat-source-side intake temperature Ts1, which is the temperature of the heat-source-side refrigerant in the intake of the heat-source-side compressor 21. The heat-source-side intake temperature sensor 44 is a temperature sensor for detecting the heat-source-side discharge temperature Td1, which is the temperature of the heat-source-side refrigerant in the discharge of the heat-source-side compressor 21. The first and second heat-source-side heat exchange gas-side temperature sensors 45a, 45b are temperature sensors for detecting the heat-source-side heat exchange gas-side temperatures Thg1, Thg2, which are the temperatures of the refrigerant in the gas side of the first and second heat-source-side heat exchangers 26a, 26b. The first and second heat-source-side heat exchange liquid-side temperature sensors 46a, 46b are temperature sensors for detecting the heat-source-side heat exchange liquid-side temperatures Thl1, Thl2, which are the temperatures of the heat-source-side refrigerant in the liquid side of first and second the heat-source-side heat exchangers 26a, 26b, The outside-air temperature sensor 47 is a temperature sensor for detecting the outside air temperature To. The heat source unit 2 has a heat-source-side controller 49 for controlling the operation of each part constituting the heat source unit 2. The heat-source-side controller 49 has a microcomputer, memory, and the like for controlling the heat source unit 2. The heat-source-side controller 49 is capable of communicating with later-described usage-side controllers 69a, 69b of the usage units 5a, 5b by using control signals or the like.

—Discharge Refrigerant Communication Tube—

The discharge refrigerant communication tube 12 is connected to the heat-source-side discharge branching tube 21d via the discharge-side closing valve 35. The discharge refrigerant communication tube 12 is a refrigerant tube capable of drawing out the heat-source-side refrigerant from the discharge of the heat-source-side compressor 21 to the exterior of the heat source unit 2 even when the first and second heat-source-side switching mechanisms 23a, 23b are in heat-source-side heat-radiation operating state or in a heat-source-side evaporation operating state, in the case that the third heat-source-side switching mechanism 39 is in a simultaneous air-cooling/warming operating state.

—Liquid-Refrigerant Communication Tube—

The liquid-refrigerant communication tube 13 is connected to the heat-source-side liquid-refrigerant junction tube 27 via the liquid-side closing valve 33. The liquid-refrigerant communication tube is a refrigerant tube capable of drawing out the heat-source-side refrigerant from the outlet of the first and second heat-source-side heat exchangers 26a, 26b functioning as radiators of the heat-source-side refrigerant to the exterior of the heat source unit 2 when the first and second heat-source-side switching mechanisms 23a, 23b are in a heat-source-side heat-radiation operating state, The liquid-refrigerant communication tube 13 is a refrigerant tube capable of introducing the heat-source-side refrigerant from the exterior of the heat source unit 2 to the inlet of the first and second heat-source-side heat exchangers 26a, 26b functioning as evaporators of the heat-source-side refrigerant when the first and second heat-source-side switching mechanisms 23a, 23b are in a heat-source-side evaporation operating state.

—Intake Refrigerant Communication Tube—

The intake refrigerant communication tube 14 is connected to the heat-source-side gas-refrigerant tube 25 via the intake-side closing valve 34. The intake refrigerant communication tube 14 is a refrigerant tube capable of introducing the heat-source-side refrigerant from the exterior of the heat source unit 2 to the intake of the heat-source-side compressor 21, when the first and second heat-source-side switching mechanisms 23a, 23b are in a heat-source-side heat-radiation operating state or in a heat-source-side evaporation operating state.

—Usage Units—

The usage units 54, 5b are arranged indoors (e.g., each unit of a residential complex, each section of a building, or the like). The usage units 5a, 5b are connected to the heat source unit 2 via the refrigerant communication tubes 12, 13, 14, and constitute a portion of the heat-source-side refrigerant circuit 20, The usage units 5a, 5b constitute the usage-side refrigerant circuits 50a, 50b. The usage units 5a, 5b are connected to aqueous-medium air-cooling/warming units 75a, 75b via the aqueous medium communication tubes 15a, 16a, 15b, 16b, and constitute a portion of aqueous medium circuits 70a, 70b. The configuration of the usage unit 5b is the same as that of the usage unit 5a. Therefore, only the configuration of the usage unit 5a will be described here. The configuration of the usage unit 5b is the same except that the subscript "b" is used in place of the subscript "a" of the reference numerals of each part of the usage unit 5a, and a description of each part is omitted.

The usage unit 5a. mainly has a first usage-side heat exchanger 51a, a first usage-side expansion valve 52a, a second usage-side heat exchanger 151a, a second usage-side expansion valve 152a, a usage-side compressor 55a, a refrigerant/water heat exchanger 57a, a refrigerant/water heat exchange-side expansion valve 58a, a usage-side accumulator 59a, and a circulation pump 71a.

The first usage-side heat exchanger 51a is a heat exchanger that functions as a radiator of the heat-source-side refrigerant by exchanging heat between the heat-source-side refrigerant and the usage-side refrigerant. A usage-side heat exchange inlet/outlet connection tube 53a is connected to the liquid-side of the flow passage through which the heat-source-side refrigerant of the first usage-side heat exchanger 51a flows, a first usage-side gas-refrigerant tube 54a is connected to the gas side of the flow passage through which the heat-source-side refrigerant of the first usage-side heat exchanger 51a flows. A cascade-side liquid-refrigerant tube 66a is connected to the liquid-side of the flow passage through which the usage-side refrigerant of the first usage-side heat exchanger 51a flows, and a cascade-side gas-refrigerant tube 67a is connected to the gas side of the flow passage through which the usage-side refrigerant of the first usage-side heat exchanger 51a flows. The usage-side heat exchange inlet/outlet connection tube 53a is a refrigerant tube for drawing out the heat-source-side refrigerant from the outlet of the first usage-side heat exchanger 51a functioning as a radiator of the heat-source-side refrigerant to the exterior of the usage unit 5a (more specifically, the liquid-refrigerant communication tube 13). The first usage-side gas-refrigerant tube 54a is a refrigerant tube for introducing the heat-source-side refrigerant from the exterior of the usage unit 5a (more specifically, the gas refrigerant communication tube 14) to the inlet of the first usage-side heat exchanger 51a functioning as a radiator of the heat-source-side refrigerant. The refrigerant/water heat exchanger 57a is connected to the cascade-side liquid-refrigerant tube 66a, and the usage-side compressor 55a is connected to the cascade-side gas-refrigerant tube 67a.

The first usage-side expansion valve 52a is an electrically driven expansion valve capable of varying the flow rate of the heat-source-side refrigerant that flows through the first usage-side heat exchanger 51a by controlling the opening degree, and is provided to the usage-side heat exchange inlet/outlet connection tube 53a.

The usage-side compressor 55a is a mechanism for compressing the usage-side refrigerant. In this configuration, the usage-side compressor 55a is a hermetic compressor having rotary element, scroll element, or other type of positive displacement compression element (not shown) accommodated in a casing (not shown), and is driven by a usage-side compression motor 56a accommodated in the same casing. The rotational speed (i.e., operational frequency) of the usage-side compression motor 56a can be varied by using an inverter device (not shown), whereby the capacity of the usage-side compressor 55a can be controlled. A cascade-side discharge tube 60a is connected to the discharge of the usage-side compressor 55a, and the cascade-side gas-refrigerant tube 67a is connected to the intake of the usage-side compressor 55a.

The refrigerant/water heat exchanger 57a is a heat exchanger that functions as a radiator of the usage-side refrigerant by exchanging heat between the usage-side refrigerant and the aqueous medium. The cascade-side liquid-refrigerant tube 66a is connected to the liquid side of the flow passage through which the usage-side refrigerant of the refrigerant/water heat exchanger 57a flows, and the cascade-side gas-refrigerant tube 67a is connected to the gas side of the flow passage through which the usage-side refrigerant of the refrigerant/water heat exchanger 57a flows. A first usage-side water inlet tube 73a is connected to the inlet side of the flow passage through which the aqueous medium of the refrigerant/water heat exchanger 57a flows, and a first usage-side water outlet tube 74a is connected to the outlet side of the flow passage through which the aqueous medium of the refrigerant/water heat exchanger 57a flows. The first usage-side water inlet tube 73a is an aqueous medium tube for introducing the aqueous medium from the exterior of the usage unit 5a (more specifically, an aqueous medium communication tube 15a) to the inlet of the refrigerant/water heat exchanger 57a functioning as a heater of the aqueous medium. The first usage-side water outlet tube 74a is an aqueous medium tube for drawing out the aqueous medium from the outlet of the refrigerant/water heat exchanger 57a functioning as a heater of the aqueous medium to the exterior of the usage unit 5a (more specifically, an aqueous medium communication tube 16a).

The refrigerant/water heat exchange-side expansion valve 58a is an electrically driven expansion valve capable of varying the flow rate of the usage-side refrigerant that flows through the refrigerant/water heat exchanger 57a by controlling the opening degree, and is provided to the cascade-side liquid-refrigerant tube 66a.

The usage-side accumulator 59a is provided to the cascade-side gas-refrigerant tube 67a, and is a container for temporarily collecting the usage-side refrigerant that circulates through the usage-side refrigerant circuit 50a before being drawn from the cascade-side gas-refrigerant tube 67a into the usage-side compressor 55a.

Thus, the usage-side refrigerant circuit 50a has a configuration in which the usage-side compressor 55a, the refrigerant/water heat exchanger 57a, the refrigerant/water heat exchange-side expansion valve 58a, the first usage-side heat exchanger 51a, and the usage-side accumulator 59a are connected via the refrigerant tubes 60a, 66a.

The circulation pump 71a is a mechanism for increasing the pressure of the aqueous medium. In this configuration, is a pump in which a centrifugal or positive-displacement pump element (not shown) is driven by a circulation pump motor 72a. The circulation pump 71a is provided to the first usage-side water inlet tube 73a. The rotational speed (i.e., operational frequency) of the circulation pump motor 72a can be varied by using an inverter device (not shown), whereby the capacity of the circulation pump 71a can be controlled.

The second usage-side heat exchanger 151a. is a heat exchanger that functions as an evaporator of the heat-source-side refrigerant by exchanging heat between the heat-source-side refrigerant and the aqueous medium. The usage-side heat exchange inlet/outlet connection tube 53a is connected to the liquid-side of the flow passage through which the heat-source-side refrigerant of the second usage-side heat exchanger 151a flows, and a second usage-side gas-refrigerant tube 153a is connected to the gas-side of the flow passage through which the heat-source-side refrigerant of the second usage-side heat exchanger 151a flows. In other words, the usage-side heat exchange inlet/outlet connection tithe 53a functions as a refrigerant tithe for connecting the outlet of the heat-source-side refrigerant of the first usage-side heat exchanger 51a and the inlet of the heat-source-side refrigerant of the second usage-side heat exchanger 151a. Accordingly, the usage-side heat exchange inlet/outlet connection tube 53a is a refrigerant tube for introducing the heat-source-side refrigerant from the exterior of the usage unit 5a. (more specifically, the liquid-refrigerant communication tube 13) to the inlet of the second usage-side heat exchanger 151a functioning as a radiator of the heat-source-side refrigerant. A usage-side heat exchanger outlet on/off valve 154a capable of on/off control is provided to the second usage-side gas-refrigerant tube 153a. The usage-side heat exchanger outlet on/off valve 154a is composed of a solenoid valve. A second usage-side water inlet tube 173a is connected to the inlet side of the flow passage through which the aqueous medium of the second usage-side heat exchanger 151a flows, and a second usage-side water outlet tube 174a is connected to the outlet side of the flow passage through which the aqueous medium of the second usage-side heat exchanger 151a flows. The second usage-side water inlet tube 173a branches from a portion further downstream from the circulation pump 71a of the first usage-side water inlet tube 73a via a cool/warm water switching mechanism 175a. The second usage-side water outlet tube 174a merges with the first usage-side water outlet tube 74a. The cool/warm water switching mechanism 175a is a mechanism for allowing the aqueous medium heated in the refrigerant/water heat exchanger 57a or the aqueous medium cooled in the second usage-side heat exchanger 151a to be selectively exchanged with the aqueous-medium air-cooling/warming unit 75a disposed outside of the usage unit 5a. The cool/warm water switching mechanism 175a is a three-way valve.

The second usage-side expansion valve 152a is an electrically driven expansion valve capable of varying the flow rate of the heat-source-side refrigerant that flows through the second usage-side heat exchanger 151a by controlling the opening degree, and is provided to the usage-side heat exchange inlet/outlet connection tube 53a.

Various types of sensors are provided to the usage unit 5a. Specifically provided to the usage unit 5a are a first usage-side heat exchange liquid-side temperature sensor 61a, a second usage-side heat exchanger gas-side temperature sensor 156a, a second usage-side liquid-refrigerant tube temperature sensor 65a, a second usage-side heat exchanger liquid-side temperature sensor 155a, an aqueous medium inlet temperature sensor 63a, a first aqueous medium outlet temperature sensor 64a, a second aqueous medium outlet temperature sensor 159a, a usage-side intake pressure sensor 68a, a usage-side discharge pressure sensor 69a, a usage-side discharge temperature sensor 157a, a refrigerant/water heat exchange temperature sensor 158a, and a cascade-side liquid-refrigerant tube temperature sensor 160a. The first usage-side heat exchange liquid-side temperature sensor 61a is a temperature sensor for detecting a first usage-side heat exchange liquids-side temperature $Tu1a$, which is the temperature of the heat-source-side refrigerant in the liquid-side of the first usage-side heat exchanger 51a. The second usage-side heat exchanger gas-side temperature sensor 156a is a temperature sensor for detecting a second usage-side heat exchange gas-side temperature $Tug2a$, which is the temperature of the heat-source-side refrigerant in the gas-side of the second usage-side heat exchanger 151a. The second usage-side liquid-refrigerant tube temperature sensor 65a is a temperature sensor for detecting the temperature $Tuv2a$ of the heat-source-side refrigerant in the upstream side of the second usage-side expansion valve 152a. The second usage-side heat exchanger liquid-side temperature sensor 155a is a temperature sensor for detecting the second usage-side heat exchange liquid-side temperature $Tu12a$, which is the temperature of the heat-source-side refrigerant in the liquid-side of the second usage-side heat exchanger 151a. The aqueous medium inlet temperature sensor 63a is a temperature sensor for detecting the aqueous medium inlet temperature $Twra$, which is the temperature of the aqueous medium in the inlet of the refrigerant/water heat exchanger 57a and the inlet of the second usage-side heat exchanger 151a. The first aqueous medium outlet temperature sensor 64a is a temperature sensor for detecting the aqueous medium outlet temperature Tw11a, which is the temperature of the aqueous medium at the outlet of the refrigerant/water heat exchanger 57a. The second aqueous medium outlet temperature sensor 159a is a temperature sensor for detecting the aqueous medium outlet temperature Tw12a, which is the temperature of the aqueous medium at the outlet of the second usage-side heat exchanger 151a. The usage-side intake pressure sensor 68a is a pressure sensor for detecting the usage-side intake pressure Ps2a, which is the pressure of the usage-side refrigerant in the intake of the usage-side compressor 55a. The usage-side discharge pressure sensor 69a is a pressure sensor for detecting the usage-side discharge pressure Pd2a, which is the pressure of the usage-side refrigerant in the discharged of the usage-side compressor 55a. The usage-side discharge temperature sensor 157a is a temperature sensor for detecting the usage-side discharge temperature Td2a, which is the temperature of the usage-side refrigerant in the discharge of the usage-side compressor 55a, The refrigerant/water heat exchange temperature sensor 158a is a temperature sensor for detecting the cascade-side refrigerant temperature Tp11a, which is the temperature of the usage-side refrigerant in the liquid-side of the refrigerant/water heat exchanger 57a. The cascade-side liquid refrigerant tube temperature sensor 160a is a temperature sensor for detecting the temperature Tp12a of the usage-side refrigerant in the liquid-side of the first usage-side heat exchanger 51a, The usage unit 5a has a usage-side controller 69a for controlling the operation of each part constituting the usage unit 5a. The usage-side controller 69a has a microcomputer, memory, and the like for controlling the usage unit 5a. The usage-side controller 69a is capable of communicating with a remote control (not shown) and between the heat-source-side controller 49 of the heat source unit 2 by using control signals or the like.

—Aqueous-Medium Air-Cooling/Warming Unit—

The aqueous-medium air-cooling/warming units 75a, 75b (aqueous medium usage apparatuses) are arranged indoors (e.g., each unit of a residential complex, each section of a building, or the like). The aqueous-medium air-cooling/warming units 75a, 75b are connected to the usage units 5a, 5b via the aqueous medium communication tubes 15a, 15b, 16a, 16b, and constitute a portion of the aqueous medium circuits 70a, 70b. The configuration of the aqueous-medium air-cooling/warming unit 75b is the same as the configuration of the aqueous-medium air-cooling/warming unit 75a. Therefore, only the configuration of the aqueous-medium air-cooling/warming unit 75a is described herein, and the configuration of the aqueous-medium air-cooling/warming unit 75b is the same except that the subscript "b" is used in place of the subscript "a" of the reference numerals of each part of the aqueous-medium air-cooling/warming unit 75a, and a description of each part is omitted.

The aqueous-medium air-cooling/warming unit 75a mainly has a heat exchange panel 76a, and constitutes a radiator, a floor air-cooling/warming panel, or the like.

The heat exchange panel 76a is provided along the walls or the like indoors in the case of a radiator, and is provided under the floor or the like indoors in the case of a floor air-cooling/warming panel. The heat exchange panel 76a is a heat exchanger that functions as a radiator or heater of the aqueous medium that circulates through an aqueous medium circuit 70a, the aqueous medium communication tube 16a is connected to the inlet thereof and the aqueous medium communication tube 15a is connected to the outlet thereof.

—Aqueous Medium Communication Tubes—

The aqueous medium communication tubes 15a, 15b are connected to the first usage-side water inlet tubes 73a, 73b. The aqueous medium communication tubes 15a, 15b are aqueous medium tubes capable of introducing the aqueous medium from the exterior of the usage units 5a, 5b (more specifically, the aqueous-medium air-cooling/warming units 75a, 75b) to the inlets of the first usage-side heat exchangers 51a, 51b that function as heaters of the aqueous medium or to the inlets of the second usage-side heat exchangers 151a, 151b that function as coolers of the aqueous medium.

The aqueous medium communication tubes 16a, 16b are connected to first usage-side water outlet tubes 74a, 74b. The aqueous medium communication tubes 16a, 16b are aqueous medium tubes capable of drawing out the aqueous medium from the outlets of the first usage-side heat exchangers 51a, 51b that function as heaters of the aqueous medium or the outlets of the second usage-side heat exchangers 151a, 151b that function as coolers of the aqueous medium to the exterior of the usage units 5a, 5b (more specifically, the aqueous-medium air-cooling/warming units 75a, 75b).

The controller 1a for controlling the operation of the heat pump system 1 is composed of the usage-side controllers 69a, 69b and the heat-source-side controller 49, and performs the operations and various controls described below.

<Operation>

Next, the operation of the heat pump system 1 will be described.

The heat pump system 1 can operate in a full air-warming operation mode, a simultaneous air-cooling/warming operation mode, and a full air-cooling operation mode. The full air-warming operation mode is an operating mode for performing only air-warming operation in a state in which only usage units set for air-warming operation (heating operation) exist. The simultaneous air-cooling/warming operation mode is an operation mode for performing a mixed air-cooling and the air-warming operation in a state in which one of the usage units 5a, 5b is set for air-cooling operation (cooling operation) and the other of the usage units 5a, 5b is set for air-warming operation (heating operation). The full air-cooling operation mode is an operating mode for performing only air-cooling operation in a state in which only usage units set tier air-cooling operation (cooling operation) exist. The simultaneous air-cooling/warming operation mode can be divided into a simultaneous air-cooling/warming operation mode (mainly evaporation) and a simultaneous air-cooling/warming operation mode (mainly heat radiation) in accordance with the overall heat load (the total of the air-cooling load and the air-warming load) of the usage units 5a, 5b. The simultaneous air-cooling/warming operation mode (mainly evaporation) is an operating mode in which a mixed air-cooling and air-warming operation of the usage units 5a, 5b is performed, and in which the heat-source-side refrigerant is sent from the usage units 5a, 5b to the heat source unit 2 via the liquid-refrigerant communication tube 13. The simultaneous air-cooling/warming operation mode (mainly heat radiation) is an operating mode in which a mixed air-cooling and air-warming operation of the usage units 5a, 5b is performed, and in which the heat-source-side refrigerant is sent from the heat source unit 2 to the usage units 5a, 5b via the liquid-refrigerant communication tube 13.

—Full Air-Warming Operation Mode—

In the case that only air-warming operation of the usage units 5a, 5b is to be performed, the first and second heat-source-side switching mechanisms 23a, 23b are switched to the heat-source-side evaporation operating state (the state of the first and second heat-source-side switching mechanisms 23a, 23b indicated h the broken lines in FIG. 1) in the heat-source-side refrigerant circuit 20. The third heat-source-side switching mechanism 39 is switched to the simultaneous air-cooling/warming operating state (the state of the third heat-source-side switching mechanism 39 indicated by the solid lines in FIG. 1). The first and second intake-return expansion valves 30a, 30b are switched to be closed. The second usage-side expansion valves 152a, 152b and the usage-side heat exchanger outlet on/off valves 154a, 154b are switched to be closed. The cool/warm water switching mechanisms 175a, 175b are switched to a state in which the aqueous medium heated in the refrigerant/water heat exchangers 57a, 57b is fed to the aqueous-medium air-cooling/warming units 75a, 75b. In this description, all of the usage units 5a, 5b are set for air-warming operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. The high-pressure heat-source-side refrigerant from which the refrigeration machine oil has been separated out is sent from the heat source unit 2 to the discharge refrigerant communication tube 12 by way of the heat-source-side discharge branching tube 21d, the third heat-source-side switching mechanism 39, and the discharge-side closing valve 35.

The high-pressure heat-source-side refrigerant sent to the discharge refrigerant communication tube 12 is branched into two flows and sent to the usage units 5a, 5b.

The high-pressure heat-source-side refrigerant sent to the usage units 5a, 5b is sent to the first usage-side heat exchangers 51a, 51b via the first usage-side gas-refrigerant tubes 54a, 54b. The high-pressure heat-source-side refrigerant sent to the first usage-side heat exchangers 51a, 51b radiates heat in the first usage-side heat exchangers 51a, 51b by exchanging heat with the low-pressure usage-side refrigerant in the refrigeration cycle circulating through the usage-side refrigerant circuits 50a, 50b. The high-pressure heat-source-side refrigerant which has radiated heat in the first usage-side heat exchangers 51a, 51b is sent from the usage units 5a, 5b and merged with the liquid-refrigerant communication tube 13 by way of the first usage-side expansion valves 52a, 52b and the usage-side heat exchange inlet/outlet connection tubes 53a, 53b.

The heat-source-side refrigerant sent to the liquid-refrigerant communication tube 13 is sent to the heat source unit 2. The heat-source-side refrigerant sent to the heat source unit 2 is sent to the subcoolers 31a, 31b by way of the liquid-side closing valve 33 and the heat-source-side liquid-refrigerant junction tube 27. The heat-source-side refrigerant sent to the subcoolers 31a, 31b is sent to the heat-source-side expansion valves 28a, 28b without undergoing heat exchange because the heat-source-side refrigerant does not flow to the intake return tubes 29a, 29b. The heat-source-side refrigerant sent to the heat-source-side expansion valves 28a, 28b is depressurized in the heat-source-side expansion valves 28a, 28b to form a low-pressure gas-liquid two-phase state, and is then sent to the heat-source-side heat exchangers 26a, 26b by way of the heat-source-side liquid-refrigerant tubes 27a, 27b. The low-pressure heat-source-side refrigerant sent to the heat-source-side heat exchangers 26a, 26b is evaporated in the heat-source-side heat exchangers 26a, 26b by exchanging heat with outside air fed by the heat-source-side fans 36a, 36b. The low-pressure heat-source-side refrigerant evaporated in the heat-source-side heat exchangers 26a, 26b is again taken into the heat-source-side compressor 21 by way of the heat-source-side gas-refrigerant tubes 24a, 24b, the heat-source-side switching mechanisms 23a, 23b, and the heat-source-side intake tube 21c.

On the other hand, in the usage-side refrigerant circuits 50a, 50b, the low-pressure usage-side refrigerant in the refrigeration cycle circulating through the usage-side refrigerant circuits 50a, 50b is heated and evaporated by heat radiation of the heat-source-side refrigerant in the first usage-side heat exchangers 51a, 51b. The low-pressure usage-side refrigerant evaporated in the first usage-side heat exchangers 51a, 51b is sent to the usage-side accumulators 59a, 59b by way of the cascade-side gas-refrigerant tubes 67a, 67b. The low-pressure usage-side refrigerant sent to the usage-side accumulators 59a, 59b is taken into the usage-side compressors 55a, 55b, compressed to a high pressure in the refrigeration cycle, and thereafter discharged to the cascade-side discharge tubes 60a, 60b, The high-pressure usage-side refrigerant discharged to the cascade-side discharge tubes 60a, 60b is sent to the refrigerant/water heat exchangers 57a, 57b. The high-pressure usage-side refrigerant sent to the refrigerant/water heat exchangers 57a, 57b radiates heat in the refrigerant/water heat exchangers 57a, 57b by exchanging heat with the aqueous medium being circulated through the aqueous medium circuits 70a, 70b by the circulation pumps 71a, 71b. The high-pressure usage-side refrigerant which has radiated heat in the refrigerant/water heat exchangers 57a, 57b is depressurized in the refrigerant/water heat exchange expansion valves 58a, 58b to form a low-pressure gas-liquid two-phase state, and is again sent to the first usage-side heat exchangers 51a, 51b by way of the cascade-side liquid-refrigerant tubes 66a, 66b.

In the aqueous medium circuits 70a, 70b, the aqueous medium circulating through the aqueous medium circuits 70a, 70b is heated by heat radiation from the heat-source-side refrigerant in the refrigerant/water heat exchangers 57a, 57b. The aqueous medium heated in the refrigerant/water heat exchangers 57a, 57b is sent by the circulation pumps 71a, 71b from the usage units 5a, 5b to the aqueous medium communication tubes 16a, 16b by way of the first usage-side water outlet tubes 74a, 74b. The aqueous medium sent to the aqueous medium communication tubes 16a, 16b is sent to the aqueous-medium air-cooling/warming units 75a, 75b. The aqueous medium sent to the aqueous-medium air-cooling/warming units 75a, 75b radiates heat in the heat exchange panels 76a, 76b, whereby the indoor space along the walls or the like is heated and the indoor floor is also heated.

In this manner, operation in the full air-warming operation mode is performed in which only air-warming operation of the usage units 5a, 5b is performed.

—Simultaneous Air-Cooling/Warming Operation Mode (Mainly Evaporation)—

In the case of a mixed air-cooling and air-warming operation of the usage units 5a, 5b, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 1), and the other of the heat-source-side switching mechanisms 23a, 23b is switched to the heat-source-side evaporation operating state (the state of the heat-source-side switching mechanisms 23a, 23b indicated by the broken lines in FIG. 1). The third heat-source-side switching mechanism 39 is switched to a simultaneous air-cooling/warming operation state (the state of the third heat-source-side switching mechanism 39 indicated by the solid lines in FIG. 1). Among the intake-return expansion valves 30*a*, 30*b*, the intake-return expansion valve that corresponds to the heat-source-side switching mechanism switched to the heat-source-side evaporation operation state is switched to be closed. in the usage unit set for air-cooling operation among the usage units 5*a*, 5*b*, the first usage-side expansion valve is switched to be closed, the usage-side heat exchange outlet on/off valve is opened, and the cool/warm water switching mechanism is switched to a state in which the aqueous medium cooled in the second usage-side heat exchangers is fed to the aqueous-medium air-cooling/warming units. In the usage unit set for air-warming operation among the usage units 5*a*, 5*b*, the second usage-side expansion valves and the usage-side heat exchange outlet on/off valves are switched to be closed, and the cool/warm water switching mechanism is switched to a state in which the aqueous medium heated in the refrigerant/water heat exchangers is fed to the aqueous-medium air-cooling/warming units. This configuration is described with the first heat-source-side switching mechanism 23*a* switched to the heat-source-side heat-radiation operating state, the second heat-source-side switching mechanism 23*b* switched to the heat-source-side evaporation operating state, and the intake-return expansion valve 30*b* switched to be closed. Described herein is the state in which the usage unit 5*a* is set for air-cooling operation, and the usage unit 5*b* is set for air-warming operation.

In the heat-source-side refrigerant circuit 20 in such a state, the low-pressure heat-source-side refrigerant in the refrigeration cycle is taken into the heat-source-side compressor 21 by way of the heat-source-side intake tube 21*c*, compressed to a high pressure in the refrigeration cycle, and thereafter discharged to the heat-source-side discharge tube 21*b*. The refrigeration machine oil is separated out in the oil separator 22*a* from the high-pressure heat-source-side refrigerant discharged to the heat-source-side discharge tube 21*b*. The refrigeration machine oil separated out from the heat-source-side refrigerant in the oil separator 22*a* is returned to the heat-source-side intake tube 21*c* via the oil return tube 22*b*. A portion of the high-pressure heat-source-side refrigerant from which the refrigeration machine oil has been separated is sent to the first heat-source-side heat exchanger 26*a* by way of the first heat-source-side switching mechanism 23*a* and the first heat-source-side gas-refrigerant tube 24*a*, and the remainder is sent from the heat source unit 2 to the discharge refrigerant communication tube 12 by way of the heat-source-side branching tube 21*d* and the discharge-side closing valve 35. The high-pressure heat-source-side refrigerant sent to the first heat-source-side heat exchanger 26*a* radiates heat in the first heat-source-side heat exchanger 26*a* by exchanging heat with outdoor air fed by the first heat-source-side fan 36*a*. The high-pressure heat-source-side refrigerant which has radiated heat in the first heat-source-side heat exchanger 26*a* is sent to the first subcooler 31*a* by way of the first heat-source-side expansion valve 28*a*. The heat-source-side refrigerant sent to the first subcooler 31*a* is cooled to a subcooled state by exchanging heat with the heat-source-side refrigerant branched from the first heat-source-side liquid-refrigerant tube 27*a* to the first intake return tube 29*a*. The heat-source-side refrigerant that flows through the first intake return tube 29*a* is returned to the heat-source-side intake tube 21*c*. The heat-source-side refrigerant cooled in the first subcooler 31*a* is sent to the heat-source-side liquid-refrigerant junction tube 27 by way of the first heat-source-side liquid-refrigerant tube 27*a*.

The high-pressure heat-source-side refrigerant sent to tine discharge refrigerant communication tube 12 is sent to the usage unit 5*b*.

The high-pressure heat-source-side refrigerant sent to the usage unit 5*b* is sent to the first usage-side heat exchanger 51*b* via the first usage-side gas-refrigerant tube 54*b*. The high pressure heat-source-side refrigerant sent to the first usage-side heat exchanger 51*b* radiates heat in the first usage-side heat exchanger 51*b* by exchanging heat with the low-pressure usage-side refrigerant in the refrigeration cycle that flows through the usage-side refrigerant circuit 50*b*. The high-pressure heat-source-side refrigerant which has radiated heat in the first usage-side heat exchanger 51*b* is sent from the usage units 5*a*, 5*b* to the liquid-refrigerant communication tube 13 by way of the first usage-side expansion valve 52*b* and the usage-side heat exchange inlet/outlet connection tube 53*b*.

A portion of the heat-source-side refrigerant sent from the usage unit 5*b* to the liquid-refrigerant communication tube 13 is sent to the usage unit 5*a*, and the remainder is sent to the heat source unit 2.

The heat-source-side refrigerant sent from the liquid-refrigerant communication tube 13 to the usage unit 5*a*. is sent to the second usage-side expansion valve 152*a*. The heat-source-side refrigerant sent to the second usage-side expansion valve 152*a* is depressurized in the second usage-side expansion valve 152*a* to form a low-pressure gas-liquid two-phase state, and is sent to the second usage-side heat exchanger 151*a* via the usage-side heat exchange inlet/outlet connection tube 53*a*. The low-pressure heat-source-side refrigerant sent to the second usage-side heat exchanger 151*a* evaporates in the second usage-side heat exchanger 151 a by exchanging heat with the aqueous medium circulated by the circulation pump 71*a* through the aqueous medium circuit 70*a*, The low-pressure heat-source-side refrigerant evaporated in the second usage-side heat exchanger 151*a* is sent from the usage unit 5*a* to the intake refrigerant communication tube 14 by way of the usage-side heat exchanger outlet on/off valve 154*a* and the second usage-side gas-refrigerant tube 153*a*.

The low-pressure heat-source-side refrigerant sent to the intake refrigerant communication tube 14 is sent to the heat source unit 2, The low-pressure heat-source-side refrigerant sent to the heat source unit 2 is sent to the intake-side closing valve 34 and the heat-source-side gas-refrigerant tube 25. The heat-source-side refrigerant sent from the liquid-refrigerant communication tube 13 to the heat source unit 2 is sent to the heat-source-side liquid-refrigerant junction tube 27 via the liquid-side closing valve 33, and merges with the heat-source-side refrigerant from the first heat-source-side liquid-refrigerant tube 27*a*. The liquid-refrigerant merged in the heat-source-side liquid-refrigerant junction tube 27 is sent to the second subcooler 31*b* via the second heat-source-side liquid-refrigerant tube 27*b*. The heat-source-side refrigerant sent to the second subcooler 31*b* is sent to the second heat-source-side expansion valve 28*b* without undergoing heat exchange because the heat-source-side refrigerant does not flow to the second intake return tube 29*b*. The heat-source-side refrigerant sent to the second heat-source-side expansion valve 28*b* is depressurized in the second heat-source-side expansion valve 28*b* to form a low-pressure gas-liquid two-phase state, and is sent to the second heat-source-side heat exchanger 26*b* via the second heat-source-side liquid-refrigerant tube 27*b*. The low-pressure heat-source-side refrigerant sent to the second heat-source-side heat exchanger 26*b* evaporates in the second heat-source-side heat exchanger 26*b* by exchanging heat with outdoor air fed by the second heat-source-side fan 36*b*. The low-pressure heat-source-side refrigerant evaporated in the second heat-source-side heat exchanger 26*b* is sent to the heat-source-side gas-refrigerant tube 25 by way of the second heat-source-side gas-refrigerant tube 24*b*, the second heatsource-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, in the aqueous medium circuit 70a, the aqueous medium circulating through the aqueous medium circuit 70a is cooled by evaporation of the heat-source-side refrigerant in the second usage-side heat exchanger 151a. The aqueous medium cooled in the second usage-side heat exchanger 151a is sent from the usage unit 5a to the aqueous medium communication tube 16a by way of the second usage-side water outlet tube 174a and the first usage-side water outlet tube 74a. The aqueous medium sent to the aqueous medium communication tube 16a is sent to the aqueous-medium air-cooling/warming unit 75a. The aqueous medium sent to the aqueous-medium air-cooling/warming unit 75a is heated in the heat exchange panel 76a, whereby the indoor space along the walls or the like is cooled, and the indoor floor is also cooled.

In the aqueous medium circuit 70b, the aqueous medium circulating through the aqueous medium circuit 70b is heated by heat radiation of the heat-source-side refrigerant in the refrigerant/water heat exchanger 57b. The aqueous medium heated in the refrigerant/water heat exchanger 57b is sent by the circulation pump 71b from the usage unit 5b to the aqueous medium communication tube 16b by way of the first usage-side water outlet tube 74b, The aqueous medium sent to the aqueous medium communication tube 16b is sent to the aqueous-medium air-cooling/warming unit 75b. The aqueous medium sent to the aqueous-medium air-cooling/warming unit 75b radiates heat in the heat exchange panel 76b, whereby the indoor space along the walls or the like is heated, and the indoor floor is also heated.

In this manner, the simultaneous air-cooling/warming operation mode (mainly evaporation), which is a mixed air-cooling and air-warming operation, is performed in a state in which one of the usage units 5a, 5b is set for air-cooling operation, and the other of the usage units 5a, 5b is set for air-warming operation.

—Simultaneous Air-Cooling/Warming Operation Mode (Mainly Heat Radiation)—

In the case of a mixed air-cooling and air-warming operation of the usage units 5a, 5b, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 1), and the other of the heat-source-side switching mechanisms 23a, 23b is switched to the heat-source-side evaporation operating state (the state of the heat-source-side. switching mechanisms 23a, 23b indicated by the broken lines in FIG. 1). The third heat-source-side switching mechanism 39 is switched to a simultaneous air-cooling/warning operation state (the state of the third heat-source-side switching mechanism 39 indicated by the solid lines in FIG. 1). Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 5a, 5b, the first usage-side expansion valve is switched to be closed, the usage-side heat exchange outlet on/off valve is opened, and the cool/warm water switching mechanism is switched to a state in which the aqueous medium cooled in the second usage-side heat exchangers is fed to the aqueous-medium air-cooling/warming units. In the usage unit set for air-warming operation among the usage units 5a, 5b, the second usage-side expansion valves and the usage-side heat exchange outlet on/off valves are switched to be closed, and the cool/warm water switching mechanism is switched to a state in which the aqueous medium heated in the refrigerant/water heat exchangers is fed to the aqueous-medium air-cooling/warming units. This configuration is described with the first heat-source-side switching mechanism 23a switched to the heat-source-side beat-radiation operating state, the second heat-source-side switching mechanism 23b switched to the heat-source-side evaporation operating state, and the intake-return expansion valve 30b switched to be closed. Described herein, is the state in which the usage unit 5a is set for air-cooling operation, and the usage unit 5b is set for air-warming operation.

In the heat-source-side refrigerant circuit 20 in such a state, the low-pressure heat-source-side refrigerant in the refrigeration cycle is taken into the heat-source-side compressor 21 by way of the heat-source-side intake tube 21c, compressed to a high pressure in the refrigeration cycle, and thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c via the oil return tube 22b. A portion of the high-pressure heat-source-side refrigerant from which the refrigeration machine oil has been separated out is sent to the first heat-source-side heat exchanger 26a by way of the first heat-source-side switching mechanism 23a and the first heat-source-side gas-refrigerant tube 24a, and the remainder is sent from the heat source unit 2 to the discharge refrigerant communication tube 12 by way of the heat-source-side discharge branching tube 21d and the discharge-side closing valve 35. The high-pressure heat-source-side refrigerant sent to the first heat-source-side heat exchanger 26a radiates heat in the first heat-source-side heat exchanger 26a by exchanging heat with the outdoor air fed by the first heat-source-side fan 36a. The high-pressure heat-source-side refrigerant which has radiated heat in the first heat-source-side heat exchanger 26a is sent to the first subcooler 31a by way of the first heat-source-side expansion valve 28a. The heat-source-side refrigerant sent to the first subcooler 31a is cooled to a subcooled state by exchanging heat with the heat-source-side refrigerant branched from the first heat-source-side liquid-refrigerant tube 27a to the first intake return tube 29a. The heat-source-side refrigerant that flows through the first intake return tube 29a is returned to the heat-source-side intake tube 21c. The heat-source-side refrigerant cooled in the first subcooler 31a is sent to the heat-source-side liquid-refrigerant junction tube 27 by way of the first heat-source-side liquid-refrigerant tube 27a. A portion of the high-pressure heat-source-side refrigerant sent to the heat-source-side liquid-refrigerant junction tube 27 is sent to the liquid-refrigerant communication tube 13 by way of the liquid-side closing valve 33, and the remainder is sent to the second heat-source-side liquid-refrigerant tube 27b.

The high-pressure heat-source-side refrigerant sent to the discharge refrigerant communication tube 12 is sent to the usage unit 5b.

The high-pressure heat-source-side refrigerant sent to the usage unit 5b is sent to the first usage-side heat exchanger 51b by way of the first usage-side gas-refrigerant tube 54b. The high-pressure heat-source-side refrigerant sent to the first usage-side heat exchanger 51b radiates heat in the first usage-side heat exchanger 51b by exchanging heat with the low-pressure usage-side refrigerant in the refrigeration cycle that circulates through the usage-side refrigerant circuit 50b. The high-pressure heat-source-side refrigerant which has radiated heat in the first usage-side heat exchanger 51b is sent from the usage units 5a, 5b and merged with the heat-source-side refrigerant sent from the heat source unit 2 to the liquid-refrigerant communication tube 13 by way of the first usage-side expansion valve 52b and the usage-side heat exchange inlet/outlet connection tube 53b.

The heat-source-side refrigerant merged in the liquid-refrigerant communication tube 13 is sent to the usage unit 5a.

The heat-source-side refrigerant sent from the liquid-refrigerant communication tube 13 to the usage unit 5a is sent to the second usage-side expansion valve 152a. The heat-source-side refrigerant sent to the second usage-side expansion valve 152a is depressurized in the second usage-side expansion valve 152a to form a low-pressure gas-liquid two-phase, and is sent to the second usage-side heat exchanger 151a by way of the usage-side heat exchange inlet/outlet connection tube 53a. The low-pressure heat-source-side refrigerant sent to the second usage-side heat exchanger 151a evaporates in the second usage-side heat exchanger 151a by exchanging heat with the aqueous medium circulated by the circulation pump 71a through the aqueous medium circuit 70a. The low-pressure heat-source-side refrigerant evaporated in the second usage-side heat exchanger 151a is sent from the usage unit 5a to the intake refrigerant communication tube 14 by way of the usage-side heat exchanger outlet on/off valve 154a and the second usage-side gas-refrigerant tube 153a.

The low-pressure heat-source-side refrigerant sent to the intake refrigerant communication tube 14 is sent to the heat source unit 2. The low-pressure heat-source-side refrigerant sent to the heat source unit 2 is sent to the intake-side closing valve 34 and the heat-source-side gas-refrigerant tube 25. The heat-source-side refrigerant sent from the heat-source-side liquid-refrigerant junction tube 27 to the second heat-source-side liquid-refrigerant tube 27b is sent to the second subcooler 31b. The heat-source-side refrigerant sent to the second subcooler 31b is sent to the second heat-source-side expansion valve 28b without undergoing heat exchange because the heat-source-side refrigerant does not flow to the second intake return tube 29b. The heat-source-side refrigerant sent to the second heat-source-side expansion valve 28b is depressurized in the second heat-source-side expansion valve 28b to form a low-pressure gas-liquid two-phase, and is sent to the second heat-source-side heat exchanger 26b by way of the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, the aqueous medium circulating through the aqueous medium circuit 70a is cooled in the aqueous medium circuit 70a by evaporation of the heat-source-side refrigerant in the first usage-side heat exchanger 51a. The aqueous medium cooled in the first usage-side heat exchanger 51a is taken into the circulation pump 71a by way of the usage-side water outlet tube 74a, then pressurized and sent from the usage unit 5a to the aqueous medium communication tube 16a. The aqueous medium sent to the aqueous medium communication tube 16a is sent to the aqueous-medium air-cooling/warming unit 75a. The aqueous medium sent to the aqueous-medium air-cooling/warming unit 75a is heated in the heat exchange panel 76a, whereby the indoor space along the walls or the like is cooled, and the indoor floor is also cooled.

The aqueous medium circulating through the aqueous medium circuit 70b is heated in the aqueous medium circuit 70b by heat radiation of the heat-source-side refrigerant in the first usage-side heat exchanger 51b. The aqueous medium heated in the first usage-side heat exchanger 51b is taken into the circulation pump 71b by way of the usage-side water outlet tube 74b, then pressurized and sent from the usage unit 5b to the aqueous medium communication tube 16b. The aqueous medium sent to the aqueous medium communication tube 16b is sent to the aqueous-medium air-cooling/warming unit 75b. The aqueous medium sent to the aqueous-medium air-cooling/warming unit 75b radiates heat in the heat exchange panel 76b, whereby the indoor space along the walls or the like is heated, and the indoor floor is also heated.

In this manner, the simultaneous air-cooling/warming operation mode (mainly heat radiation) is an operation mode for performing a mixed air-cooling and air-warming operation in a state in which one of the usage units 5a, 5b is set for air-cooling operation, and the other of the usage units 5a, 5b is set for air-warming operation.

—Full Air-Cooling Operation Mode—

In the case that only air-cooling operation of the usage units 5a, 5b is to be performed, the first and second heat-source-side switching mechanisms 23a, 23b are switched to the heat-source-side heat-radiation operating state (the state of the first and second heat-source-side switching mechanisms 23a, 23b indicated by the solid lines in FIG. 1) in the heat-source-side refrigerant circuit 20. The third heat-source-side switching mechanism 39 is switched to the simultaneous air-cooling/warming operating state (the state of the third heat-source-side switching mechanism 39 indicated by the solid lines in FIG. 1). The first usage-side expansion valves 52a, 52b are switched to be closed, and the usage-side heat exchanger outlet on/off valves 154a, 154b are opened. The cool/warm water switching mechanisms 175a, 175b are switched to a state in which the aqueous medium cooled in the second usage-side heat exchangers 151a, 151b is fed to the aqueous-medium air-cooling/warming units 75a, 75b. In this description, all of the usage units 5a, 5b are set for air-cooling operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil is separated out in the oil separator 22a from the high-pressure heat-source side refrigerant discharged to the heat-source-side discharge tube 21b. The refrigeration machine oil separated out from the heat-source-side refrigerant in the oil separator 22a is returned to the heat-source-side intake tube 21c by way of the oil return tube 22b. The high-pressure heat-source-side refrigerant from which the refrigeration machine oil has been separated out is sent to the heat-source-side heat exchangers 26a, 26b by way of the heat-source-side switching mechanisms 23a, 23b and the heat-source-side gas-refrigerant tubes 24a, 24b. The high-pressure heat-source-side refrigerant sent to the heat-source-side heat exchangers 26a, 26b radiates heat in the heat-source-side heat exchangers 26a, 26b by exchanging heat with the outdoor air fed by the heat-source-side fans 36a, 36b. The high-pressure heat-source-side refrigerant which has radiated heat in the heat-source-side heat exchangers 26a, 26b is sent to the subcoolers 31a, 31b by way of the heat-source-side expansion valves 28a, 28b. The heat-source-side refrigerant sent to the subcoolers 31a, 31b is cooled to a subcooled state by exchanging heat with the heat-source-side refrigerant branched from the heat-source-side liquid-refrigerant tubes 27a, 27b to the intake return tubes 29a, 29b. The heat-source-side refrigerant that flows through the intake return tubes 29a, 29b is returned to the heat-source-side intake tube 21c. The heat-source-side refrigerant cooled in the subcoolers 31a, 31b is sent from the heat source unit 2 to the liquid-refrigerant communication tube 13 by way of the heat-source-side liquid-refrigerant tubes 27a, 27b, the heat-source-side liquid-refrigerant junction tube 27, and the liquid-side closing valve 33.

The high-pressure heat-source-side refrigerant sent to the liquid-refrigerant communication tube 13 is branched into two flows and sent to the usage units 5a, 5b, The high-pressure heat-source-side refrigerant sent to the usage units 5a, 5b is sent to the second usage-side expansion valves 152a, 152b. The high-pressure heat-source-side refrigerant sent to the second usage-side expansion valves 152a, 152b is depressurized in the second usage-side expansion valves 152a, 152b to form a low-pressure gas-liquid two-phase state, and is sent to the second usage-side heat exchangers 151a, 151b by way of the usage-side heat exchange inlet/outlet connection tubes 53a, 53b. The low-pressure heat-source-side refrigerant sent to the second usage-side heat exchangers 151a, 151b evaporates in the second usage-side heat exchangers 151a, 151b by exchanging heat with the aqueous medium circulated by the circulation pumps 71a, 71b through the aqueous medium circuits 70a, 70b. The low-pressure heat-source-side refrigerant evaporated in the second usage-side heat exchangers 151a, 151b is sent from the usage units 5a, 5b to the intake refrigerant communication tube 114 and merged by way of the usage-side heat exchanger outlet on/off valves 154a, 154b and the second usage-side gas-refrigerant tubes 153a, 153b.

The low-pressure heat-source-side refrigerant sent to the intake refrigerant communication tube 14 is sent to the heat source unit 2. The low-pressure heat-source-side refrigerant sent to the heat source unit 2 is again taken into the heat-source-side compressor 21 by way of the intake-side closing valve 34, the heat-source-side gas-refrigerant tube 25, and the heat-source-side intake tube 21c.

On the other hand, in the aqueous medium circuits 70a, 70b, the aqueous medium circulating through the aqueous medium circuits 70a, 70b is cooled by evaporation of the heat-source-side refrigerant in the second usage-side heat exchangers 151a, 151b. The aqueous medium cooled in the second usage-side heat exchangers 151a, 151b is sent by the circulation pumps 71a, 71b from the usage units 5a, 5b to the aqueous medium communication tubes 16a, 16b by way of the second usage-side water outlet tubes 174a, 174b and the first usage-side water outlet tubes 74a, 74b. The aqueous medium sent to the aqueous medium communication tubes 16a, 16b is sent to the aqueous-medium air-cooling/warming units 75a, 75b. The aqueous medium sent to the aqueous-medium air-cooling/warming units 75a, 75b is heated in the heat exchange panels 76a, 76b, whereby the indoor space along the walls or the like is cooled, and the indoor floor is also cooled.

In this manner, operation in the full air-cooling operation mode is performed in which only air-cooling operation of the usage units 5a, 5b is performed.

—Switching Operation Modes, and Controlling Heat Load Balance—

As described above, the heat pump system 1 is capable of handling operating states in which the air-cooling operation (cooling operation) or the air-warming operation (heating operation) are arbitrarily set for each of the usage units 5a, 5b by switching operating modes. in other words, in a state in which the air-cooling operation or air-warming operation is set for each of the usage units 5a, 5b, the heat pump system 1 causes the first and second heat-source-side heat exchangers 26a, 26b to function as evaporators of the heat-source-side refrigerant or as radiators of the heat-source-side refrigerant in accordance with the heat load of all the usage units 5a, 5b, making it possible to perform operation in which the heat load of all the usage units 5a, 5b is balanced.

In the heat pump system 1, switching the operating modes described above and controlling the heat load balance are performed in the manner described below.

First, the controller 1a determines whether the operating mode is the full air-warming operation mode, the simultaneous air cooling/warming operation mode, or the full air-cooling operation mode on the basis of the operating state set in the usage units 5a, 5b. In other words, the controller determines that the mode is the full air-warming operation mode in the case that there are only usage units set for the air-warming operation. The controller determines that the mode is the simultaneous air cooling/warming operation mode in the case of a mixed air-cooling and air-warming operation. Specifically, the determination is made based on the on/off states of the first usage-side expansion valves 52a, 52b and the second usage-side expansion valves 152a, 152b of the usage units 5a, 5b.

The controller 1a controls the operating capacity of the heat-source-side compressor 21 so that the heat-source-side condensing temperature Tc1 corresponding to the saturation temperature of the heat-source-side refrigerant in the discharge of the heat-source-side compressor 21 reaches a predetermined target heat-source-side condensing temperature Tc1s in the case of the full air-warming operation mode. More specifically, the controller 1a performs control so as to increase the operating capacity of the heat-source-side compressor 21 by increasing the rotational speed (i.e., operational frequency) of the heat-source-side compressor 21 in the case that the heat-source-side condensing temperature Tc1 is less than the target heat-source-side condensing temperature Tc1s. This makes it possible to resolve a state in which the evaporation load of the heat-source-side refrigerant in the heat-source-side heat exchangers 26a, 26b is less than the heat load of the all the usage units 5a, 5b, and to balance the two loads. The controller 1a performs control so as to reduce the operating capacity of the heat-source-side compressor 21 by reducing the rotational speed (i.e., operational frequency) of the heat-source-side compressor 21 in the case that the heat-source-side condensing temperature Tc1 is greater than the target heat-source-side condensing temperature Tc1s. This makes it possible to resolve a state in which the evaporation load of the heat-source-side refrigerant in the heat-source-side heat exchangers 26a, 26b is greater than the heat load of the all the usage units 5a, 5b, and to balance the two loads. The heat-source-side condensing temperature Tc1 is a value obtained by converting the heat-source-side discharge pressure Pd1, which is the pressure of the heat-source-side refrigerant in the discharge of the heat-source-side compressor 21, to the saturation temperature that corresponds to this pressure value. The heat-source-side condensing temperature Tc1 corresponds to a value obtained by converting the high-pressure in the refrigeration cycle of the heat-source-side refrigerant circuit 20 to the saturation temperature, i.e., the saturation temperature (condensing temperature) of the heat-source-side refrigerant in the first usage-side heat exchanger for performing air-warming operation among the first usage-side heat exchangers 51a, 51b.

The controller 1a controls the operating capacity of the heat-source-side compressor 21 so that the heat-source-side condensing temperature Tc1 reaches the target heat-source-side condensing temperature Tc1s in the case of the simultaneous air cooling/warming operation mode. However, in the case of a mixed air-cooling and air-warming operation of the usage units 5a, 5b, the heat load of all the usage units 5a, 5b tends to be reduced and the heat load required by the heat-source-side heat exchangers 26a, 26b tends to be reduced as well. In view of the above, in the simultaneous air cooling/warming operation mode, one of the heat-source-side switching mechanisms 23a, 23b is switched to the heat-source-side heat-radiation operating state, and the other of the heat-source-side switching mechanisms 23a, 23b is switched to the heat-source-side evaporation operating state as described above while controlling the operating capacity of the heat-source-side compressor 21, Thereby, the evaporative capability in the heat-source-side heat exchangers that function as evaporators of the heat-source-side refrigerant is increased to offset the radiation capacity of the heat-source-side heat exchangers that function as radiators of the heat-source-side refrigerant, and to reduce the heat load of all the heat-source-side heat exchangers 26a, 26b. This makes it possible to handle a state in which the heat load of all the usage units 5a, 5b is low, such as the simultaneous air cooling/warming operation mode, and to balance the two loads. The heat-source-side condensing temperature Tc1 corresponds to the saturation temperature (condensing temperature) of the heat-source-side refrigerant in the heat-source-side heat exchanger that functions as a radiator of the heat-source-side refrigerant among the heat-source-side heat exchangers 26a, 26b.

In the case of full air-cooling operation mode, the controller 1a controls the operating capacity of the heat-source-side compressor 21 so that the heat-source-side evaporation temperature Te1, which corresponds to the saturation temperature of the heat-source-side refrigerant in the intake of the heat-source-side compressor 21, reaches a predetermined target heat-source-side evaporation temperature Te1s. More specifically, the controller 1a performs control so as to reduce the operating capacity of the heat-source-side compressor 21 by reducing the rotational speed (i.e., operational frequency) of the heat-source-side compressor 21 in the case that the heat-source-side evaporation temperature Te1 is less than the target heat-source-side evaporation temperature Te1s. This makes it possible to resolve a state in which the radiation load of the heat-source-side refrigerant in the heat-source-side heat exchangers 26a, 26b is greater than the heat load of the all the usage units 5a, 5b, and to balance the two loads. The controller 1a performs control so as to increase the operating capacity of the heat-source-side compressor 21 by increasing the rotational speed (i.e., operational frequency) of the heat-source-side compressor 21 in the case that the heat-source-side evaporation temperature Te1 is greater than the target heat-source-side evaporation temperature Te1s. This makes it possible to resolve a state in which the radiation load of the heat-source-side refrigerant in the heat-source-side heat exchangers 26a, 26b is less than the heat load of the all the usage units 5a, 5b, and to balance the two loads. The heat-source-side evaporation temperature Te1 is a value obtained by converting the heat-source-side intake pressure Ps1, which is the pressure of the heat-source-side refrigerant in the intake of the heat-source-side compressor 21, to the saturation temperature that corresponds to this pressure value. The heat-source-side evaporation temperature Te1 corresponds to a value obtained by converting the low-pressure in the refrigeration cycle of the heat-source-side refrigerant circuit 20 to a saturation temperature, i.e., the saturation temperature (condensing temperature) of the heat-source-side refrigerant in the usage-side heat exchanger that performs air-cooling operation among the second usage-side heat exchangers 151a, 151b.

—Controlling the Usage-Side Condensing Temperature, and Setting the Target Usage-Side Condensing Temperature and the Target Heat-Source-Side Condensing Temperature—

With the heat pump system 1, the usage-side refrigerant circulating through the usage-side refrigerant circuits 50a, 50b is heated in the first usage-side heat exchangers 51a, 51b by heat radiation of the heat-source-side refrigerant circulating through the heat-source-side refrigerant circuit 20 during the full air-warming operation mode and the simultaneous air cooling/warming operation mode, as described above. The usage-side refrigerant circuits 50a, 50b can achieve a refrigeration cycle having a temperature greater than the refrigeration cycle in the heat-source-side refrigerant circuit 20 by using the heat obtained from the heat-source-side refrigerant. Therefore, a high-temperature aqueous medium can be obtained by heat radiation of the usage-side refrigerant in the refrigerant/water heat exchangers 57a, 57b. At this point, it is preferred that control be performed so that the refrigeration cycle in the heat-source-side refrigerant circuit 20 and the refrigeration cycle in the usage-side refrigerant circuits 50a, 50b are stabilized in order to stably obtain a high-temperature aqueous medium.

In view of the above, the controller 1a controls the operating capacity of the heat-source-side compressor 21 described above, and controls the operating capacity of the usage-side compressors 55a, 55b so that the usage-side condensing temperatures Tc2a, Tc2b, which correspond to the saturation temperatures of the usage-side refrigerant in the discharge of the usage-side compressors 55a, 55b, reach predetermined target usage-side condensing temperatures Tc2as, Tc2bs. More specifically, the controller 1a performs control so that the operating capacity of the usage-side compressors 55a, 55b is increased by increasing the rotational speed (i.e., operational frequency) of the usage-side compressors 55a, 55b in the case that the usage-side condensing temperatures Tc2a, Tc2b are less than the target usage-side condensing temperatures Tc2as, Tc2bs. The controller 1a performs control so that operating capacity of the usage-side compressors 55a, 55b is reduced by reducing the rotational speed (i.e., operational frequency) of the usage-side compressors 55a, 55b in the case that the usage-side condensing temperatures Tc2a, Tc2b are greater than the target usage-side condensing temperatures Tc2as, Tc2bs. The pressure of the heat-source-side refrigerant that flows through the first usage-side heat exchangers 51a, 51b is thereby stabilized in the heat-source-side refrigerant circuit 20, and the pressure of the usage-side refrigerant that flows through the refrigerant/water heat exchangers 57a, 57b is stabilized in the usage-side refrigerant circuits 50a, 50b. The state of the refrigeration cycle in the refrigerant circuits 20, 50a, 50b can be stabilized and a high-temperature aqueous medium can be obtained in a stable manner. The usage-side condensing temperatures Tc2a, Tc2b are values obtained by converting the usage-side discharge pressures Pd2a, Pd2b, which are the pressures of the usage-side refrigerant in the discharge of the usage-side compressors 55a, 55b, to saturation temperatures that correspond to these pressure values. The usage-side condensing temperatures Tc2a, Tc2b are values obtained by converting the high pressure in the refrigeration cycle of the usage-side refrigerant circuits 50a, 50b to saturation temperatures, i.e., the saturation temperatures (condensing temperatures) of the usage-side refrigerant in the refrigerant/water heat exchanger that carries out air-warming operation among the refrigerant/water heat exchangers 57a, 57b.

In this case, it is preferred that the target heat-source-side condensing temperature Tc1s is and the target usage-side condensing temperatures Tc2as, Tc2bs be appropriately set in order to obtain the aqueous medium setting temperature required in the usage units 5a, 5b.

In view of the above, the controller 1a sets the target usage-side condensing temperatures Tc2as, Tc2bs for the usage-side refrigerant circuits 50a, 50b on the basis of the target aqueous medium outlet temperatures Tw1las, Tw1lbs, which are the temperature settings of the aqueous medium at the outlet of the refrigerant/water heat exchangers 57a, 57b, More specifically, the target usage-side condensing temperatures Tc2as, Tc2bs are set as values that vary with the target aqueous medium outlet temperatures Tw1las, Tw1las. For example, the target usage-side condensing temperatures Tc2as, Tc2bs are set to 85° C. in the case that the target aqueous medium outlet temperatures Tw1las, Tw1lbs are set to 75° C. The target usage-side condensing temperatures Tc2as, Tc2bs are set to 513° C. in the case that the target aqueous medium outlet temperatures Tw1las, Tw1lbs are set to 40° C. In other words, the target usage-side condensing temperatures Tc2as, Tc2bs are converted to functions and set so as to increase with increased settings for the target aqueous medium outlet temperatures Tw1las, Tw1lbs, and so as to be a slightly higher than the target aqueous medium outlet temperatures Tw1las, Tw1las. Since the target usage-side condensing temperatures Tc2as, Tc2bs are thereby appropriately set on the basis of the target aqueous medium outlet temperatures Tw1las, Tw1lbs, the target aqueous medium outlet temperatures Tw1las, Tw1lbs are more readily obtained, and control with good responsiveness can be obtained even when the target aqueous medium outlet temperatures Tw1las, Tw1lbs have been modified.

—Setting the Target Heat-Source-Side Condensing Temperature for the Simultaneous Air Cooling/Warming Operation Mode Under Low Outside Air Conditions—

With the heat pump system 1, the refrigeration cycle in the heat-source-side refrigerant circuit 20 is preferably capable of being appropriately controlled in accordance with the state of the refrigeration cycle in the usage-side refrigerant circuits 50a, 50b during the full air-warming operation mode and the simultaneous air cooling/warming operation mode. In view of the above, the target heat-source-side condensing temperature Tc1s is appropriately set on the basis of the target usage-side condensing temperatures Tc2as, Tc2bs (i.e., target aqueous medium outlet temperatures Tw1las, Tw1lbs) by the controller 1a. More specifically, the target heat-source-side condensing temperature is set so as to vary with the target usage-side condensing temperatures Tc2as, Tc2bs (i.e., target aqueous medium outlet temperatures Tw1las, Tw1lbs). In other words, the target heat-source-side condensing temperature Tc1s is converted to a function and set so as to increase with increased settings for the target usage-side condensing temperatures Tc2as, Tc2bs (i.e., target aqueous medium outlet temperatures Tw1las, Tw1lbs).

In this configuration, the control of the heat load balance by the heat-source-side heat exchangers 26a, 26b during the simultaneous air cooling/warning operation mode described above entails increasing the operating capacity of the heat-source-side compressor 21 though the heat load required by all of the heat-source-side heat exchangers 26a, 26b is low. Accordingly, there is a problem in that the power consumption of the heat-source-side compressor 21 is increased and the operating efficiency is reduced. Also, the heat radiation capability of the heat-source-side heat exchangers functioning as refrigerant radiators tends to increase and the tendency toward reduced operating efficiency become pronounced.

In view of the above, the controller 1a operates so that the heat-source-side condensing temperature Tc1 is below 40° C. in the case that the outside air temperature Ta is 25° C. or lower and a mixed air-cooling (cooling) and air-warming (heating) operation is performed (i.e., simultaneous air cooling/warming operation mode). Here, operation is performed so that the heat-source-side condensing temperature Tc1 is brought below 40° C. by controlling the operating capacity of the heat-source-side compressor 21. In other words, the operating capacity of the heat-source-side compressor 21 is controlled so that the heat-source-side condensing temperature Tc1 is stabilized at below 40° C. by setting the target heat-source-side condensing temperature Tc1s to a level below 40° C. Here, the target heat-source-side condensing temperature Tc1s is set to within a temperature range of 30° C. to 40° C. in the case that the target usage-side condensing temperatures Tc2as, Tc2bs are set to 85° C. The target usage-side condensing temperatures Tc2as, Tc2bs are set to within a temperature range of 10° C. to 20° C. in the case that the target usage-side condensing temperatures Tc2as, Tc2bs are set to 50° C. and in the case that the target aqueous medium outlet temperatures Tw1las, are set to 40° C.

With the heat pump system 1, the temperature difference between the outside air temperature Ta and the heat-source-side condensing temperature Tc1 is reduced, and the heat radiation capability of the heat-source-side heat exchangers functioning as radiators of the heat-source-side refrigerant can be considerably reduced. The evaporative capability of the heat-source-side heat exchangers that function as evaporators of the heat-source-side refrigerant offsets the heat radiation capability of the heat-source-side heat exchangers functioning as radiators of the heat-source-side refrigerant, allowing the evaporative capability can to be reduced as well. Therefore, the heat load of all the usage units 5a, 5b can be readily balanced. Since an increase in the operating capacity of the heat-source-side compressor 21 can be reduced, an increase in the power consumption of the heat-source-side compressor 21 can be suppressed, and operation can be performed with good efficiency.

<Characteristics>

The heat pump system 1 has the following characteristics.

—A—

Figure 2:
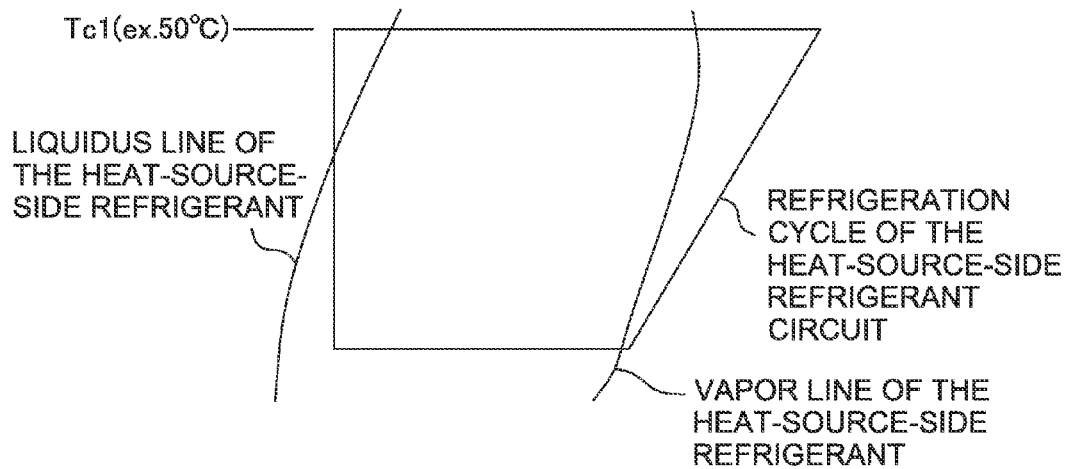
FIG. 2 is a cycle diagram for the case in which the heating operation is performed by a single refrigeration cycle of the heat-source-side refrigerant cycle.

In the heat pump system 1, the heat-source-side condensing temperature Tc1 must be set to about 50° C. or higher when the system is configured so that the air-warming operation (heating operation) is performed by heating the aqueous medium by heat exchange between the heat-source-side refrigerant and the aqueous medium in the first usage-side heat exchangers 51a, 51b (see FIG. 2).

However, the temperature difference between the heat-source-side condensing temperature Tc1 (about 50° C. or higher) and the outside air temperature Ta is 25° C. or higher under low outside air temperature conditions in which the outside air temperature Ta is 25° C. or lower. Accordingly, in the case of a mixed air-cooling (cooling) and air-warming (heating) operation (i.e., simultaneous air cooling/warming operation mode), there is a very strong tendency for the heat radiation capability of the heat-source-side heat exchanger functioning as a radiator of the heat-source-side refrigerant to increase, and it becomes difficult to control the heat radiation capability of the heat-source-side refrigerant, which functions as a radiator of the heat-source-side refrigerant. When the heat-source-side condensing temperature Tc1 is reduced, the tendency of the heat radiation capability of the heat-source-side heat exchangers functioning as radiators of the heat-source-side refrigerant to increase can be suppressed and control is facilitated. Conversely, it is difficult to keep the heat-source-side condensing temperature at about 50° C. or higher and to sufficiently heat the aqueous medium.

Thus, it is difficult both to control the heat radiation capacity of the heat-source-side heat exchangers, which function as radiators of the heat-source-side refrigerant, and to maintain the heat-source-side condensing temperature Tc1 for heating operation in the case that the outside air temperature Ta is 25° C. or lower and the cooling and heating operations coexist.

In view of the above, with the heat pump system 1, the usage units 5a, 5b are provided with usage-side compressors 55a, 55b and refrigerant/water heat exchangers 57a, 57b, and the usage units 5a, 5b furthermore have usage-side refrigerant circuits 50a, 50b in which the first usage-side heat exchangers 51a, 51b function as evaporators of the usage-side refrigerant and function as radiators of the heat-source-side refrigerant.

Figure 3:
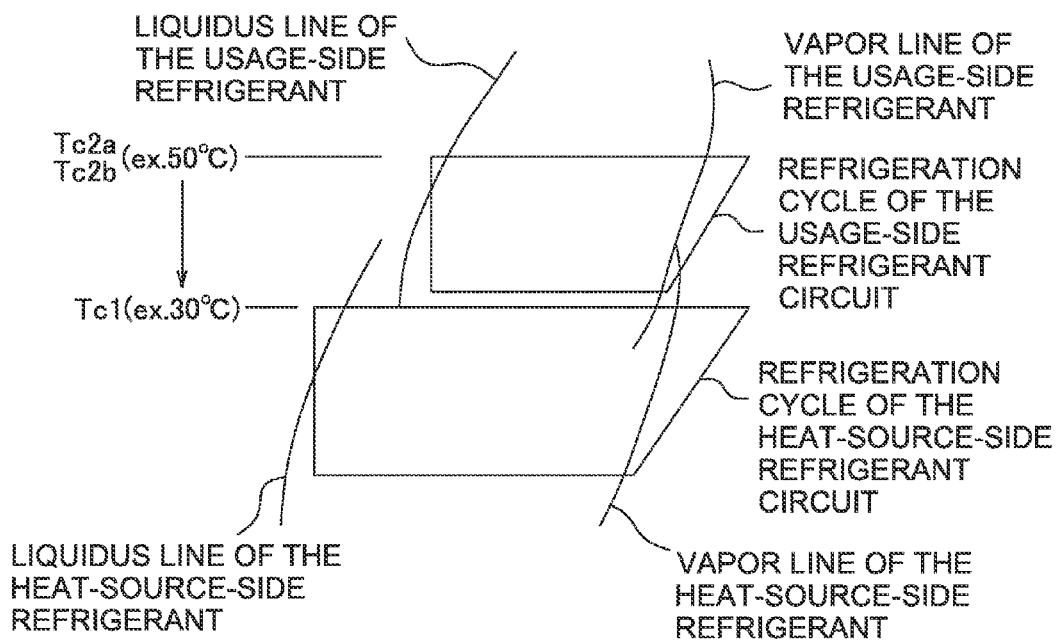
FIG. 3 is a cycle diagram for the case in which the heating operation is performed by a dual refrigeration cycle of the heat-source-side refrigerant circuit and the usage-side refrigerant circuit.

In the heat pump system 1, the aqueous medium can thereby be heated during the heating operation by a dual refrigeration cycle composed of a heat-source-side refrigerant circuit 20 and usage-side refrigerant circuits 50a, 50b. Accordingly, the usage-side condensing temperatures Tc2a, Tc2b of the usage-side refrigerant that exchanges heat with the aqueous medium can be increased in the refrigerant/water heat exchangers 57a, 57b, even when the heat-source-side condensing temperature Tc1 of the heat-source-side refrigerant sent to the first usage-side heat exchangers 51a, 51b is low (see FIG. 3). In other words, with the heat pump system 1, the aqueous medium is heated during the heating operation by the dual refrigeration cycle composed of the heat-source-side refrigerant circuit 20 and the usage-side refrigerant circuits 50a, 50b. Therefore, the heat-source-side condensing temperature Tc1 of the heat-source-side refrigerant sent to the first usage-side heat exchangers 51a, 51b can be reduced.

For this reason, with this heat pump system 1, the heat-source-side condensing temperature Tc1 is no longer required to be kept at about 50° C. or higher, and operation can be performed so that the heat-source-side condensing temperature Tc1 is below 40° C., even in the case that the outside air temperature Ta is 25° C. or lower and the cooling and heating operations coexist. When the heat-source-side condensing temperature Tc1 is brought to below 40° C., the temperature difference between the outside air temperature Ta 25° C.) and the heat-source-side condensing temperature Tc1 (below 40° C.) is less than 15° C., and the temperature difference can be kept to about half the temperature difference (25° C.) of the case in which the heat-source-side condensing temperature Tc1 is about 50° C. Therefore, the heat radiation capability of the heat-source-side heat exchangers which function as radiators of the heat-source-side refrigerant can be considerably reduced, and it becomes easier to balance the heat load of the entire plurality of usage units 5a, 5b while carrying out the desired air-warming operation. Since it is possible to suppress an increase in the operating capacity of the heat-source-side compressor 21, an increase of the power consumption of the heat-source-side compressor can be suppressed and operation can be performed with good efficiency With the heat pump system 1, HFC-134a, which is an HFC-based refrigerant in which the pressure that corresponds to a saturated gas temperature of 65° C. is a maximum gauge pressure of 2.8 MPa or less, is used as the usage-side refrigerant in the air-warming operation or hot-water supply operation (heating operation). The heat pump system 1 is useful in radiators or other applications that require hot water or another high-temperature aqueous medium, because it is possible to perform operation for heating the aqueous medium to 65° C. or higher.

—B—

The heat pump system 1 operates by controlling the operating capacity of the heat-source-side compressor 21 so as to bring the heat-source-side condensing temperature Tc1 to below 40° C. in the case that the outside air temperature Ta is 25° C. or tower and a mixed air-cooling cooling) and air-warming (heating) operation is performed (i.e., simultaneous air cooling/warming operation mode). In this case, the operating capacity of the heat-source-side compressor 21 is controlled so that the heat-source-side condensing temperature Tc1 is brought to the target heat-source-side condensing temperature Tc1s. Therefore, the heat-source-side condensing temperature Tc1 can be stabilized at below 40° C. by setting the target heat-source-side condensing temperature Tc1s to below 40° C.

—C—

In the heat pump system 1, the usage-side heat exchangers are divided into the first usage-side heat exchangers 51a, 51b for air-warming operation (heating operation) and the second usage-side heat exchangers 151a, 151b for air-cooling operation (cooling operation). Accordingly, in the heat pump system 1, the structure of the heat exchangers can be simplified in comparison with, e.g., a structure of usage-side heat exchangers through which the heat-source-side refrigerant, the usage-side refrigerant, and the aqueous medium can flow.

—D—

The heat-source-side evaporation temperature Te1, which is the temperature that corresponds to the saturation temperature of the heat-source-side refrigerant in the heat-source-side heat exchangers 26a, 26b functioning as refrigerant evaporators, tends to become very low in the case that outside air temperature is tow and the heat-source-side heat exchangers 26a, 26b functioning as evaporators of the heat-source-side refrigerant are present (during simultaneous air cooling/warming operation mode and the full air-warming operation mode). Therefore, the temperature of the heat-source-side refrigerant in the second usage-side heat exchangers 151a, 151b is reduced and the aqueous medium tends to cool and freeze when air-cooling operation (cooling operation) is not performed.

In view of this situation, in the heat pump system 1, the outlet of the heat-source-side refrigerant of the second usage-side heat exchangers 151a, 151b is provided with usage-side heat exchanger outlet on/off valves 154a, 154b which are shut off when air-cooling operation is not performed and are opened when air-cooling operation is performed.

The heat-source-side refrigerant of the second usage-side heat exchangers 151a, 151b can thereby be prevented from acquiring a tow temperature when air-cooling operation is not being performed, and freezing of the aqueous medium can be suppressed, <Modification 1>

With the heat pump system 1 (see FIG. 1) described above, operation is performed by controlling the operating capacity of the heat-source-side compressor 21 so as to bring the heat-source-side condensing temperature Tc1 to below 40° C. or lower in the case that the outside air temperature Ta is 25°

C. or lower and a mixed air-cooling (cooling) and air-warming (heating) operation is performed (i.e., simultaneous air cooling/warming operation mode).

Additionally; the controller controls the operating airflow rate of the heat-source-side fans 36a, 36b may be controlled in order to further suppress the heat radiation capability of the heat-source-side heat exchangers functioning as radiators of the heat-source-side refrigerant.

For example, in the simultaneous air cooling/warming operation mode, the controller 1a controls the operating airflow rate of the heat-source-side fans that feed outdoor air to the heat-source-side heat exchangers functioning as radiators of the heat-source-side refrigerant among the heat-source-side fans 36a, 36b, so that the heat-source-side condensing temperature Tc1 reaches the target heat-source-side condensing temperature Tc1s, in the same manner as the control of the operation capacity of the heat-source-side compressor 21. More specifically, the controller 1a reduces the operating airflow rate of the heat-source-side fan by reducing the rotational speed (i.e., operational frequency) of the heat-source-side fan in the case that the heat-source-side condensing temperature Tc1 is higher than the target heat-source-side condensing temperature Tc1s. Operation can therefore be performed with good efficiency because the heat radiation capability of the heat-source-side heat exchangers functioning as radiators of the heat-source-side refrigerant can be further suppressed.

<Modification 2>

In the heat pump system 1 described above (see FIG. 1), there are cases in which operation must be performed in the simultaneous air cooling/warming operation mode under conditions in which the outside air temperature Ta has fallen even further. In other words, there are cases in which the outside air temperature Ta is 10° C. or lower, a mixed air-cooling (cooling) and air-warming (heating) operation is performed, and heat-source-side heat exchangers functioning as evaporators of the heat-source-side refrigerant are present.

In this case, the heat-source-side evaporation temperature Te1 tends to fall to 0° C. or lower. Accordingly, there is also the possibility that the temperature of the heat-source-side refrigerant that flows through the second usage-side heat exchangers for performing cooling operation will also fall to 0° C. or lower, and the aqueous medium cooled by evaporation of the heat-source-side refrigerant in the second usage-side heat exchangers will freeze.

This problem can be overcome by providing a pressure adjustment valve in order to prevent a reduction in the pressure of the heat-source-side refrigerant at the outlet of the heat-source-side refrigerant of the second usage-side heat exchangers for performing cooling operation, but it is possible that the operation cannot be performed with good efficiency due to pressure drop of the pressure adjustment valve.

In view of the above, with the heat pump system 1 of the present modification, cooling operation is intermittently performed in the case that the outside air temperature Ta is 10° C. or lower, that the cooling and heating operations coexist, that the heat-source-side heat exchangers that function as evaporators of the heat-source-side refrigerant are present, and that the heat-source-side evaporation temperature Te1 has reached a lower limit evaporation temperature Te1m or less.

More specifically, the controller 1a determines whether the outside air temperature Ta is 10° C. or lower, whether the mode is a simultaneous air cooling/warming operation mode, and whether the heat-source-side evaporation temperature Te1 is equal to or less than the lower limit evaporation temperature Te1m. Here, the lower limit evaporation temperature Te1m is a value set with consideration given to whether or not the aqueous medium has frozen in the second usage-side heat exchangers 151a, 151b, and is set to, e.g., 0°.

In the case that the determination conditions described above are satisfied, the controller 1a repeatedly performs a control procedure in which the usage-side heat exchanger outlet on-off valves and the second usage-side expansion valves of the usage units for performing cooling operation are shut off for a fixed length of time, and the valves are then opened for a fixed length of time. The cooling operation is thereby performed in an intermittent fashion.

With the heat pump system 1 of the present modification, the cooling operation can thereby be performed while suppressing freezing of the aqueous medium and while suppressing a reduction in efficiency in comparison with the case in which a pressure adjustment valve is provided.

(2) Second Embodiment

<Configuration>

—Overall Configuration—

Figure 4:
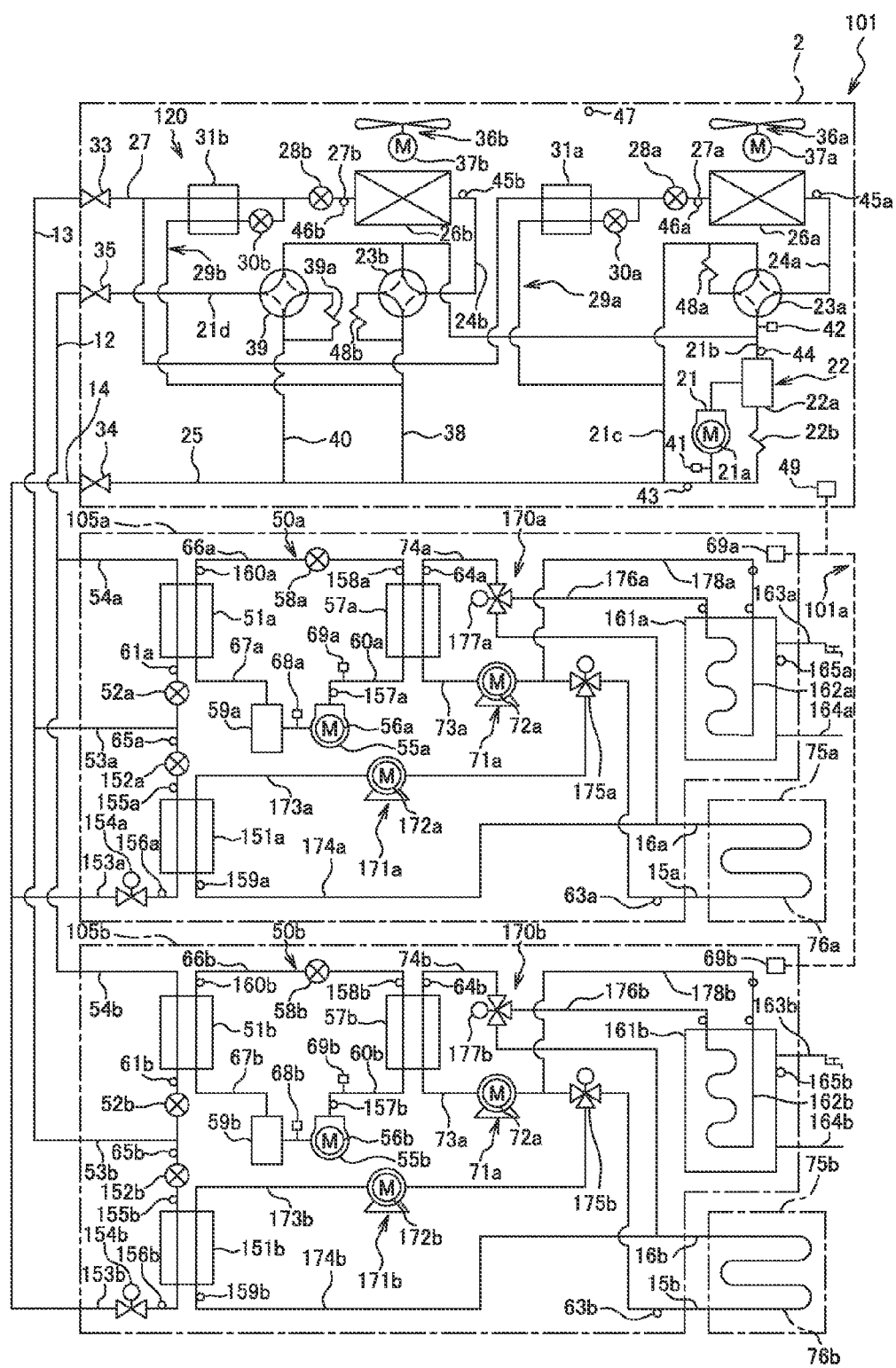
FIG. 4 is a schematic structural diagram of the heat pump system according to the second embodiment of the present invention.

FIG. 4 is a schematic structural diagram of the heat pump system 101 according to the second embodiment of the present invention, The heat pump system 101 is an apparatus capable of performing an air-cooling operation (cooling operation), air-warming operation, and hot-water supply operation (heating operation) using a vapor compression heat pump cycle.

The heat pump system 101 mainly has a heat source unit 2, a plurality (two in FIG. 4) of usage units 105a, 105b, a discharge refrigerant communication tube 12, a liquid-refrigerant communication tube 13, an intake refrigerant communication tube 14, aqueous medium air-cooling/air-heating units 75a, 75b (aqueous medium usage apparatuses), and aqueous medium communication tubes 15a, 16a, 15b, 16b. The heat source unit 2 and usage units 105a, 105b are made into a heat-source-side refrigerant circuit 20 by being connected via the refrigerant communication tubes 12, 13, 14. The usage units 105a, 105b constitute usage-side refrigerant circuits 50a, 50b, The usage units 105a, 105b and the aqueous medium air-cooling/air-heating units 75a, 75b are made into aqueous medium circuits 70a, 70b by being connected via the aqueous medium communication tubes 15a, 16a, 15b, 16b. HFC-410A, which is a type of HFC-based refrigerant, is enclosed inside the heat-source-side refrigerant circuit 20 as a heat-source-side refrigerant. HFC-134a, which is a type of HFC-based refrigerant, is enclosed inside the usage-side refrigerant circuits 50a, 50b as a usage-side refrigerant. The usage-side refrigerant is (preferably one in which the pressure that corresponds to a saturated gas temperature of 65° C. is a maximum gauge pressure of 2.8 MPa or less, and is more preferably a refrigerant of 2.0 MPa or less from the viewpoint of using a refrigerant that is advantageous for a high-temperature refrigeration cycle. HFC-134a is a type of refrigerant having such saturation pressure characteristics. Water used as the aqueous medium circulates in the aqueous medium circuits 70a, 70b.

—Heat Source Unit—

The heat source unit 2 is disposed outdoors (e.g., the roof or the like of buildings and residential complexes). The heat source unit 2 is connected to the usage units 105a, 105b via the refrigerant communication tubes 12, 13, 14 and constitutes a portion of the heat-source-side refrigerant circuit 20. The configuration of the heat source unit 2 is the same as the configuration of the heat source unit 2 of the first embodiment. Therefore, a detailed description of the heat source unit 2 will be omitted here.

—Discharge Refrigerant Communication Tube—

The discharge refrigerant communication tube 12 has the same configuration as the discharge refrigerant communication tube 12 of the first embodiment. Therefore, a detailed description of the discharge refrigerant communication tube 12 will be omitted here.

—Liquid-Refrigerant Communication Tube—

The liquid-refrigerant communication tube 13 has the same configuration as the liquid-refrigerant communication tube 13 of the first embodiment. Therefore, a detailed description of the liquid-refrigerant communication tube 13 will be omitted here.

—Intake Refrigerant Communication Tube—

The intake refrigerant communication tube 14 has the same configuration as the intake refrigerant communication tube 14 of the first embodiment. Therefore, a detailed description of the intake refrigerant communication tube 14 will be omitted here.

—Usage Units—

The usage units 105a, 105b are arranged indoors (e.g., each unit of a residential complex, each section of a building, or the like). The usage units 105a, 105b are connected to the heat source unit 2 via the refrigerant communication tubes 12, 13, 14, and constitute a portion of the heat-source-side refrigerant circuit 20. The usage units 105a, 105b constitute the usage-side refrigerant circuits 50a, 50b. The usage units 105a, 105b are connected to aqueous-medium air-cooling/warming units 75a, 75b via the aqueous medium communication tubes 15a, 16a, 15b, 16b, and constitute a portion of aqueous medium circuits 70a, 70b. The configuration of the usage unit 105b is the same as that of the usage unit 105a, Therefore, only the configuration of the usage unit 105a will be described here. The configuration of the usage unit 105b is the same except that the subscript "b" is used in place of the subscript "a" in the reference numerals of each part of the usage unit 105a, and a description of each part is omitted.

The usage unit 105a mainly has a first usage-side heat exchanger 51a, a first usage-side expansion valve 52a, a second usage-side heat exchanger 151a, a second usage-side expansion valve 152a, a usage-side compressor 55a, a refrigerant/water heat exchanger 57a, a refrigerant/water heat exchange-side expansion valve 58a, a usage-side accumulator 59a, a first circulation pump 71a, a second circulation pump 171a, and a hot-water storage tank 161a, Excluding the aqueous medium circuit 170a, the configuration of the usage unit 105a is the same as the usage unit 5a of the first embodiment. Therefore, only the aqueous medium circuit 170a will be described here.

The second circulation pump 171a is a mechanism for increasing the pressure of the aqueous medium. In this configuration, is a pump in which a centrifugal or positive-displacement pump element (not shown) is driven by a second circulation pump motor 172a. The second circulation pump 171a is provided to the second usage-side water inlet tube 73a. The rotational speed (i.e., operational frequency) of the second circulation pump motor 172a can be varied by using an inverter device (not shown.), whereby the capacity of the second circulation pump 171a can be controlled. The second usage-side water inlet tube 173a branches from a portion further upstream from the circulation pump 71a of the first usage-side water inlet tube 73a via a cool/warm water switching mechanism 175a. The second. usage-side water outlet tube 174a merges with the first usage-side water outlet tube 74a. The cool/warm water switching mechanism 175a is a mechanism for allowing the aqueous medium heated in the refrigerant/water heat exchanger 57a or the aqueous medium cooled in the second usage-side heat exchanger 151a to be selectively exchanged with the aqueous-medium air-cooling/warming unit 75a disposed outside of the usage unit 5a. The cool/warm water switching mechanism 175a is a three-way valve.

The hot-water storage tank 161a is disposed indoors (in this case, inside the usage unit 105a). The hot-water storage tank 161a is a container for storing water as the aqueous medium fed by the hot-water supply. A hot-water supply tube 163a for sending the aqueous medium converted to hot water to a faucet, a shower, or the like is connected to the upper portion of the hot-water storage tank 161a, and a water supply tube 164a for supplementing the aqueous medium consumed by the hot-water supply tube 163a is connected to the lower portion of the hot-water storage tank 161a. A heat exchange coil 162a is disposed inside the hot-water storage tank 161a.

The heat exchange coil 162a is disposed inside the hot-water storage tank 161a. The heat exchange coil 162a is a heat exchanger functioning as a heater of the aqueous medium inside the hot-water storage tank 161a by exchanging heat between the aqueous medium inside the hot-water storage tank 161a and the aqueous medium circulating through the aqueous medium circuit 70a. A hot-water storage tank-side water inlet tube 176a branched from the first usage-side water outlet tube 74a is connected to the inlet of the heat exchange coil 162a. A hot-water storage tank-side water outlet tube 178a that merges with the first usage-side water inlet tube 73a is connected to the outlet of the heat exchange coil 162a, The hot-water storage tank-side water inlet tube 176a branches from the first usage-side water outlet tube 74a via an air-warming/hot-water switching mechanism 177a. The air-warming/hot-water switching mechanism 177a is capable of switching supply of the aqueous medium circulating through the aqueous medium circuit 70a to both the hot-water storage tank 161 a and the aqueous medium air cooling/warming unit 75a, or to one of the hot-water storage tank 161 a and the aqueous medium air cooling/warming unit 75a. The air-warming/hot-water switching mechanism 177a is composed of a three-way valve. The hot-water storage tank-side water outlet tube 178a merges with the first usage-side water inlet tube 73a between the cool/warm water switching mechanism 175a and the first circulation pump 71a. The hot-water storage tank 161a can thereby store the aqueous medium as warm water, the aqueous medium inside the hot-water storage tank 161a being heated by the aqueous medium heated in the usage unit 5a and circulated through the aqueous medium circuit 70a. In this configuration, the hot-water storage tank 161a is a hot-water storage tank of a type that holds an aqueous medium heated by exchanging heat with an aqueous medium heated in the usage unit 105a, but it is also possible to use a hot-water storage tank of a type that stores an aqueous medium heated in the usage unit 105a.

The usage unit 105a is provided with various sensors. The sensors disposed in the usage unit 105a are the same as those of the usage unit 5a of the first embodiment, except that a hot-water storage temperature sensor 165a is provided. Therefore, only the hot-water storage temperature sensor 165a will be described here. The hot-water storage temperature sensor 165a is a temperature sensor for detecting the hot-water storage temperature Twha, which is the temperature of the aqueous medium stored in the hot-water storage tank 161a. The usage unit 105a has a usage-side controller 69a for controlling the operation of each part constituting the usage unit 105a. The usage-side controller 69a has a microcomputer, memory, and the like for controlling the usage unit 105a. The usage-side controller 69a is capable of communicating with a remote control (not shown) and with the heat-source-side controller 49 of the heat source unit 2 by using control signals or the like.

—Aqueous-Medium Air-Cooling/Warming Unit—

The aqueous-medium air-cooling/warming units 75a, 75b (aqueous medium usage apparatuses) have the same configuration as the aqueous medium air cooling/warming units 75a, 75b of the first embodiment, Therefore, a detailed description of the aqueous medium air cooling/warming units 75a, 75b will be omitted here.

—Aqueous Medium Communication Tubes—

The aqueous medium communication tubes 15a, 16a have the same configuration as the aqueous medium communication tubes 15a, 16a. of the first embodiment. Therefore, a detailed description of the aqueous medium communication tubes 15a, 16a will be omitted here.

A controller 101a for controlling the operation of the heat pump system 101 is composed of the usage-side controllers 69a, 69b and the heat-source-side controller 49, and is used for performing the operation and various controls described below, <Operation>

Next, the operation of the heat pump system 101 will be described.

The heat pump system 101 can operate in a full air-warming operation mode, a simultaneous air-cooling/warming operation mode, and a full air-cooling operation mode. The full air-warming operation mode is an operating mode for performing only air-warming operation (and/or hot-water supply operation) in a state in which only usage units set for air-warming operation and/or hot-water supply operation (heating operation) exist. The simultaneous air-cooling/warming operation mode is an operation mode for performing a mixed air-cooling and air-warming operation (and/or hot-water supply operation) in a state in which one of the usage units 105a, 105b is set for air-cooling operation (cooling operation) and the other of the usage units 105a, 105b is set for air-warming operation (heating operation) or hot-water supply operation (heating operation), or in a state in which at least one of the usage units 105a, 105b is set for air-cooling/hot-water supply operation to perform a simultaneous cooling operation and hot-water supply operation. The full air-cooling operation mode is an operating mode for performing only air-cooling operation in a state in which only usage units set for air-cooling operation (cooling operation) exist. The simultaneous air-cooling/warming operation mode can be divided into a simultaneous air-cooling/warming operation mode (mainly evaporation) and a simultaneous air-cooling/warming operation mode (mainly heat radiation) in accordance with the overall heat load (the total of the air-cooling load and the air-warming load) of the usage units 105a, 105b. The simultaneous air-cooling/warming operation mode (mainly evaporation) is an operating mode in which a mixed air-cooling and air-warming operation (and/or hot-water supply operation) of the usage units 105a, 105b is performed, and in which the heat-source-side refrigerant is sent from the usage units 105a, 105b to the heat source unit 2 via the liquid-refrigerant communication tube 13. The simultaneous air-cooling/warming operation mode (mainly heat radiation) is an operating mode in which a mixed air-cooling and air-warming operation (and/or hot-water supply operation) of the usage units 105a, 105b is performed, and in which the heat-source-side refrigerant is sent from the heat source unit 2 to the usage units 105a, 105b via the liquid-refrigerant communication tube 13.

—Full Air-Warming Operation Mode—

In the case that only air-warming operation of the usage units 105a, 105b is to be performed, the first and second heat-source-side switching mechanisms 23a, 23b are switched to the heat-source-side evaporation operating state (the state of the first and second heat-source-side switching mechanisms 23a, 23b indicated by the broken lines in FIG. 4) in the heat-source-side refrigerant circuit 20. The third heat-source-side switching mechanism 39 is switched to the simultaneous air-cooling/warming operating state (the state of the third heat-source-side switching mechanism 39 indicated by the solid lines in FIG. 4). The first and second intake-return expansion valves 30a, 30b are switched to be closed. The second usage-side expansion valves 152a, 152b and the usage-side heat exchanger outlet on/off valves 154a, 154b are switched to be closed. The cool/warm water switching mechanisms 175a, 175b and the air-warming/hot-water supply switching mechanisms 177a, 177b are switched to a state in which the aqueous medium heated in the refrigerant/water heat exchangers 57a, 57b is fed to the aqueous-medium air-cooling/warming units 75a, 75b and/or the hot-water storage tanks 161a, 161b. In this description, all of the usage units 105a, 105b are set for air-warming operation. Here, the operation in which all of the usage units 105a, 105b are set for air-warming operation is the same operation as when the usage units 5a, 5b of the first embodiment are all set of air-warming operation. Therefore, a detailed description of the operation when the usage units 105a, 105b are all set for air-warming operation will be omitted here.

In the case that the usage units 105a, 105b perform hot-water supply operation, the air-warming/hot-water supply switching mechanisms can be switched so that the aqueous medium heated in the refrigerant/water heat exchangers is fed to the hot-water storage tanks in the usage units, which are performing hot-water supply operation. The aqueous medium heated in the refrigerant/water heat exchangers 57a, 57b is thereby fed by the first circulation pumps 71a, 71b to the hot-water storage tanks 161a, 161b by way of the first usage-side water outlet tubes 74a, 74b and hot-water storage tank-side water inlet tubes 176a, 176b. The heat exchange coils 162a, 162b radiate heat by performing heat exchange with the aqueous medium inside the hot-water storage tanks 161a, 161b to heat the aqueous medium inside the hot-water storage tanks 161a, 161b.

In the case that the air-warming operation and hot-water supply operation of the usage units 105a, 105b are simultaneously performed, the air-warming/hot-water supply switching mechanism in the usage units that are performing air-warming operation and hot-water supply operation can be switched so that the aqueous medium heated in the refrigerant/water heat exchangers is fed to the aqueous-medium air-cooling/warming units and to the hot-water storage tanks.

In this manner, operation in the full air-warming operation mode is performed in which only the air-warming operation (and/or hot-water supply operation) of the usage units 105a, 105b is performed.

—Simultaneous Air-Cooling/Warming Operation Mode (Mainly Evaporation)—

In the case of a mixed air-cooling and air-warming operation (and/or hot-water supply operation) of the usage units 105a, 105b, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 4), and the other of the heat-source-side switching mechanisms 23a, 23b is switched to the heat-source-side evaporation operating state (the state of the heat-source-side switching mechanisms 23a, 23b indicated by the broken lines in FIG. 4). The third heat-source-side switching mechanism 39 is switched to a simultaneous air-cooling/warming operation state (the state of the third heat-source-side switching mechanism 39 indicated by the solid lines in FIG. 4). Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 105a, 105b, the first usage-side expansion valve is switched to be closed, the usage-side heat exchange outlet on/off valve is opened, and the cool/warm water switching mechanism is switched to a state in which the aqueous medium cooled in the second usage-side heat exchangers is fed to the aqueous-medium air-cooling/warming units. In the usage unit set for air-warming operation (and/or hot-water supply operation) among the usage units 105a, 105b, the second usage-side expansion valves and the usage-side heat exchange outlet on/off valves are switched to be closed, and the cool/warm water switching mechanism is switched to a state in which the aqueous medium heated in the refrigerant/water heat exchangers is fed to the aqueous-medium air-cooling/warming units. This configuration is described with the first heat-source-side switching mechanism 23a switched to the heat-source-side heat-radiation operating state, the second heat-source-side switching mechanism 23b switched to the heat-source-side evaporation operating state, and the intake-return expansion valve 30b switched to be closed. Described herein is the state in which the usage unit 105a is set for air-cooling operation, and the usage unit 105b is set for air-warming operation (and/or hot-water supply operation). Here, operation in which the usage unit 105a is set for air-cooling operation and the usage unit 105b is set for air-warming operation is the same as the operation in which the usage unit 5a of the first embodiment is set for air-cooling operation and the usage unit 5b is set for air-warming operation. Therefore, a detailed description of the operation in which the usage unit 105a is set for air-cooling operation and the usage unit 105b is set for air-warming operation is omitted here.

In the case that the usage units 105a, 105b perform hot-water supply operation, the air-warming/hot-water supply switching mechanism in the usage units that perform hot-water supply operation can be switched so that the aqueous medium heated in the refrigerant/water heat exchangers is fed to the hot-water storage tanks The aqueous medium heated in the refrigerant/water heat exchangers is thereby fed by the first circulation pumps to the hot-water storage tanks by way of the first usage-side water outlet tubes and hot-water storage tank-side water inlet tubes. The heat exchange coils radiate heat by performing heat exchange with the aqueous medium inside the hot-water storage tanks to heat the aqueous medium inside the hot-water storage tanks.

In the case that the air-warming operation and the hot-water supply operation of the usage units 105a, 105b are performed simultaneously; the air-warming/hot-water supply switching mechanism in the usage units that perform air-warming operation and hot-water supply operation can be switched so that the aqueous medium heated in the refrigerant/water heat exchangers is fed to the aqueous medium air cooling/warming units and the hot-water storage tanks.

In this manner, operation is performed in the simultaneous air cooling/warming operation mode (mainly evaporation) for performing a mixed air-cooling and air-warming operation (and/or hot-water supply operation) in a state in which one of the usage units 105a, 105b is set for air-cooling operation, and the other of the usage units 105a, 105b is set for air-warming operation.

It is also possible to set a state in which at least one of the usage units 105a, 105b is set for air-cooling/hot-water supply operation to perform simultaneous cooling operation and hot-water supply operation. In this case, one of the heat-source-side switching mechanisms 23a, 23b in the heat-source-side refrigerant circuit 20 is switched to a heat-source-side heat-radiation operating state (the state the heat-source-side switching mechanisms 23a, 23b indicated by the solid lines in FIG. 4) in the same manner as described above, and the other of the heat-source-side switching mechanisms 23a, 23b is switched to the heat-source-side evaporation operating state (the state of the heat-source-side switching mechanisms 23a, 23b indicated by the broken lines in FIG. 4). The third heat-source-side switching mechanism 39 is switched to a simultaneous air-cooling/warming operation state (the state of the third heat-source-side switching mechanism 39 indicated by the solid lines in FIG. 4). Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 105a, 105b, the first and second usage-side expansion valves are opened, the usage-side heat exchange outlet on/off valve is opened, the cool/warm water switching mechanism is switched to a state in which the aqueous medium cooled in the second usage-side heat exchangers is fed to the aqueous-medium air-cooling/warming units, and the air-warming/hot-water supply switching mechanism is switched to a state in which the aqueous medium heated in the refrigerant/water heat exchangers is fed to the hot-water storage tanks. Described hereinbelow is the state in which all of the usage units 105a, 105b are set for air cooling/hot-water supply operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21 c by way of the oil return tube 22b. A portion of the high-pressure heat-source-side refrigerant from which the refrigeration machine oil has been separated out is sent to the first heat-source-side heat exchanger 26a by way of the first heat-source-side switching mechanism 23a and the first heat-source-side gas-refrigerant tube 24a, and the remainder is sent from the heat source unit 2 to the discharge refrigerant communication tube 12 by way of the heat-source-side discharge branching tube 21d and the discharge-side closing valve 35. The high-pressure heat-source-side refrigerant sent to the first heat-source-side heat exchanger 26a undergoes heat exchange with outside air fed by the first heat-source-side fan 36a and radiates heat in the first heat-source-side heat exchanger 26a. The high-pressure heat-source-side refrigerant that have radiated heat in the first heat-source-side heat exchanger 26a is sent to the first subcooler 31a by way of the first heat-source-side expansion valve 28a. The heat-source-side refrigerant sent to the first subcooler 31a is cooled so that the heat-source-side refrigerant branched from the first heat-source-side liquid-refrigerant tube 27a to the first intake return tube 29a undergoes heat exchange with the heat-source-side refrigerant and is brought to a subcooled state. The heat-source-side refrigerant that flows through the first intake return tube 29a is returned to the heat-source-side intake tube 21c. The heat-source-side refrigerant in the first subcooler 31a is sent to the heat-source-side liquid-refrigerant junction tube 27 by way of the first heat-source-side liquid-refrigerant tube 27a.

The high-pressure heat-source-side refrigerant sent to the discharge refrigerant communication tube 112 is branched into two flows and sent to the usage units 105a, 105b.

The high-pressure heat-source-side refrigerant sent to the usage units 105a, 105b is sent to the first usage-side heat exchangers 51a, 51b via the first usage-side gas-refrigerant tubes 54a, 54b. The high-pressure heat-source-side refrigerant sent to the first usage-side heat exchangers 51a, 51b radiates heat in the first usage-side heat exchangers 51a, 51b by exchanging heat with the low-pressure usage-side refrigerant in the refrigeration cycle circulating through the usage-side refrigerant circuits 50a, 50b. The high-pressure heat-source-side refrigerant which has radiated heat in the first usage-side heat exchangers 51a, 51b is sent to the usage-side heat exchange inlet/outlet connection tubes 53a, 53b by way of the first usage-side expansion valves 52a, 52b. A portion of the heat-source-side refrigerant sent to the usage-side heat exchange inlet/outlet connection tubes 53a, 53b is sent to the liquid-refrigerant communication tube 13 and is merged, and the remainder is sent to the second usage-side expansion valves 152a, 152b.

The heat-source-side refrigerant sent to the liquid-refrigerant communication tube 13 and being merged is sent to the heat source unit 2.

The heat-source-side refrigerant sent to the second usage-side expansion valves 152a, 152b is depressurized in the second usage-side expansion valves 152a, 152b to form a low-pressure gas-liquid two-phase state, and is sent to the second usage-side heat exchangers 151a, 151b by way of the usage-side heat exchange inlet/outlet connection tubes 53a, 53b.

The low-pressure heat-source-side refrigerant sent to the second usage-side heat exchangers 151a, 151b evaporates in the second usage-side heat exchangers 151a, 151b by exchanging heat with the aqueous medium circulated by the second circulation pumps 171a, 171b through the aqueous medium circuits 70a, 70b. The low-pressure heat-source-side refrigerant evaporated in the second usage-side heat exchangers 151a, 151b is sent from the usage units 105a, 105b to the intake refrigerant communication tube 14 and is merged by way of the usage-side heat exchanger outlet on/off valves 154a, 154b and the second usage-side gas-refrigerant tubes 153a, 153b.

The low-pressure heat-source-side refrigerant sent to the intake refrigerant communication tube 14 is sent to the heat source unit 2. The low-pressure heat-source-side refrigerant sent to the heat source unit 2 is sent to the intake-side closing valve 34 and the heat-source-side gas-refrigerant tube 25. The heat-source-side refrigerant sent from the liquid-refrigerant communication tube 13 to the heat source unit 2 is sent to the heat-source-side liquid-refrigerant junction tube 27 by way of the liquid-side closing valve 33 and is merged with the heat-source-side refrigerant from the first heat-source-side liquid-refrigerant tube 27a. The liquid refrigerant merged in the heat-source-side liquid-refrigerant junction tube 27 is sent to the second subcooler 31b by way of the second heat-source-side liquid-refrigerant tube 27b. The heat-source-side refrigerant sent to the second subcooler 31b is sent to the second heat-source-side expansion valve 28b without undergoing heat exchange because the heat-source-side refrigerant does not flow to the second intake return tube 29b. The heat-source-side refrigerant sent to the second heat-source-side expansion valve 28b is depressurized in the second heat-source-side expansion valve 28b to form a low-pressure gas-liquid two-phase state, and is sent to the second heat-source-side heat exchanger 26b by way of the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with the outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, in the aqueous medium circuits 70a, 70b, the aqueous medium circulating through the aqueous medium circuits 70a, 70b is cooled by evaporation of the heat-source-side refrigerant in the second usage-side heat exchangers 151a, 151b. The aqueous medium cooled in the second usage-side heat exchangers 151a, 151b is sent by the second circulation pumps 171a, 171b from the usage units 105a, 105b to the aqueous medium communication tubes 16a, 1ob by way of the second usage-side water outlet tubes 174a, 174b and the first usage-side water outlet tubes 74a, 74b. The aqueous medium sent to the aqueous medium communication tubes 16a, 16b is sent to the aqueous medium air cooling/warming units 75a, 75b. The aqueous medium sent to the aqueous medium air cooling/warming units 75a, 75b is heated in the heat exchange panels 76a, 76b, whereby the indoor space along the walls or the like is cooled, and the indoor floor is also cooled.

In the aqueous medium circuits 70a, 70b, the aqueous medium circulating through the aqueous medium circuits 70a, 70b is heated by the heat radiation of the heat-source-side refrigerant in the refrigerant/water heat exchangers 57a, 57b. The aqueous medium heated in the refrigerant/water heat exchangers 57a, 57b is fed by the first circulation pumps 71a, 71b to the hot-water storage tanks 161a, 161b by way of the first usage-side water outlet tubes 74a, 74b and the hot-water storage tank-side water inlet tubes 176a, 176b. The heat exchange coils 162a, 162b radiate heat and perform heat exchange with the aqueous medium inside the hot-water storage tanks 161a, 161b heat the aqueous medium inside the hot-water storage tanks 161a, 161b.

In this manner, operation in the simultaneous air cooling/warming operation mode (mainly evaporation) fir performing a mixed air-cooling and air-warming operation (and/or hot-water supply operation) is performed in a state in which at least one of the usage units 105a, 105b is set to air-cooling/hot-water operation for simultaneously carrying out air-cooling operation and hot-water supply operation.

—Simultaneous Air-Cooling/Warming Operation Mode (Mainly Heat Radiation)—

In the case of a mixed air-cooling and air-warming operation (and/or hot-water supply operation) of the usage units 105a, 105b, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 4), and the other of the heat-source-side switching mechanisms 23a, 23b is switched to the heat-source-side evaporation operating state (the state of the heat-source-side switching mechanisms 23a, 23b indicated by the broken lines in FIG. 4). The third heat-sourceside switching mechanism 39 is switched to a simultaneous air-cooling/warming operation state (the state of the third heat-source-side switching mechanism 39 indicated by the solid lines in FIG. 4). Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 105a, 105b, the first usage-side expansion valve is switched to be closed, the usage-side heat exchange outlet on/off valve is opened, and the cool/warm water switching mechanism is switched to a state in which the aqueous medium cooled in the second usage-side heat exchangers is fed to the aqueous-medium air-cooling/warming units. In the usage unit set for air-warming operation among the usage units 105a, 105b, the second usage-side expansion valves and the usage-side heat exchange outlet on/off valves are switched to be closed, and the cool/warm water switching mechanism is switched to a state in which the aqueous medium heated in the refrigerant/water heat exchangers is fed to the aqueous-medium air-cooling/warming units. This configuration is described with the first heat-source-side switching mechanism 23a switched to the heat-source-side heat-radiation operating state, the second heat-source-side switching mechanism 23b switched to the heat-source-side evaporation operating state, and the intake-return expansion valve 30b switched to be closed. Described herein is the state in which the usage unit 105a is set for air-cooling operation, and the usage unit 105b is set for air-warming operation. Here, operation in a state in which the usage unit 105a is set for air-cooling operation and the usage unit 105b is set for air-warming operation is the same as the operation in which the usage unit 105a of the first embodiment is set for air-cooling operation and the usage unit 105b is set for air-warming operation. Therefore, a detailed description of the operation in the state in which the usage unit 105a is set to air-cooling operation and the usage unit 105b is set to air-warming operation will be omitted.

In the case that the usage units 105a, 105b perform hot-water supply operation, the air-warming/hot-water supply switching mechanism in the usage units that perform hot-water supply operation can be switched so that the aqueous medium heated in the refrigerant/water heat exchangers is fed to the hot-water storage tanks The aqueous medium heated in the refrigerant/water heat exchangers is thereby fed by the first circulation pumps to the hot-water storage tanks by way of the first usage-side water outlet tubes and hot-water storage tank-side water inlet tubes. The heat exchange coils radiate heat and perform heat exchange with the aqueous medium inside the hot-water storage tanks to heat the aqueous medium inside the hot-water storage tanks.

In the case that the air-warming operation and the hot-water supply operation of the usage units 105a, 105b are performed simultaneously, the air-warming/hot-water supply switching mechanism in the usage units that perform air-warming operation and hot-water supply operation can be switched so that the aqueous medium heated in the refrigerant/water heat exchangers is fed to the aqueous medium air cooling/warming units and the hot-water storage tanks.

In this manner, operation is performed in the simultaneous air cooling/warming operation mode (mainly evaporation) for performing a mixed air-cooling and air-warming operation (and/or hot-water supply operation) in a state in which one of the usage units 105a, 105b is set for air-cooling operation, and the other of the usage units 105a, 105b is set for air-warming operation.

It is also possible to set a state in which at least one of the usage units 105a, 105b is set for air-cooling/hot-water supply operation to perform simultaneous cooling operation and hot-water supply operation. In this case, one of the heat-source-side switching mechanisms 23a, 23b in the heat-source-side refrigerant circuit 20 is switched to a heat-source-side heat-radiation operating state (the state of the heat-source-side switching mechanisms 23a, 23b indicated by the solid lines in FIG. 4) in the same manner as described above, and the other of the heat-source-side switching mechanisms 23a, 23b is switched to the heat-source-side evaporation operating state (the state of the heat-source-side switching mechanisms 23a, 23b indicated by the broken lines in FIG. 4). The third heat-source-side switching mechanism 39 is switched to a simultaneous air-cooling/warming operation state (the state of the third heat-source-side switching mechanism 39 indicated by the solid lines FIG. 4), Among the intake-return expansion valves 30a, 30b, the intake-return expansion valve that corresponds to the heat-source-side switching mechanism switched to the heat-source-side evaporation operation state is switched to be closed. In the usage unit set for air-cooling operation among the usage units 105a, 105b, the first and second usage-side expansion valves are opened, the usage-side heat exchange outlet on/off valve is opened, the cool/warm water switching mechanism is switched to a state in which the aqueous medium cooled in the second usage-side heat exchangers is fed to the aqueous-medium air-cooling/warming units, and the air-warming/hot-water supply switching mechanism is switched to a state in which the aqueous medium heated in the refrigerant/water heat exchangers is fed to the hot-water storage tanks. Described hereinbelow is the state in which all of the usage units 105a, 105b are set for air cooling/hot-water supply operation.

In the heat-source-side refrigerant circuit 20 in such a state, low-pressure heat-source-side refrigerant in the refrigeration cycle is taken into the heat-source-side compressor 21 via the heat-source-side intake tube 21c, is compressed to a high pressure in the refrigeration cycle, and is thereafter discharged to the heat-source-side discharge tube 21b. The refrigeration machine oil of the high-pressure heat-source-side refrigerant discharged to the heat-source-side discharge tube 21b is separated out in the oil separator 22a. The refrigeration machine oil separated out from the heat-source-side refrigerant in the oil separator 22a is returned to the heat-source-side intake tube 21c by way of the oil return tube 22b. A portion of the high-pressure heat-source-side refrigerant from which the refrigeration machine oil has been separated out is sent to the first heat-source-side heat exchanger 26a by way of the first heat-source-side switching mechanism 23a and the first heat-source-side gas-refrigerant tube 24a, and the remainder is sent from the heat source unit 2 to the discharge refrigerant communication tube 12. by way of the heat-source-side discharge branching tube 21d and the discharge-side closing valve 35. The high-pressure heat-source-side refrigerant sent to the first heat-source-side heat exchanger 26a undergoes heat exchange with outside air fed by the first heat-source-side fan 36a and radiates heat in the first heat-source-side heat exchanger 26a. The high-pressure heat-source-side refrigerant which has radiated heat in the first heat-source-side heat exchanger 26a is sent to the first sub-cooler 31a by way of the first heat-source-side expansion valve 28a. The heat-source-side refrigerant sent to the first subcooler 31a is cooled so that the heat-source-side refrigerant branched from the first heat-source-side liquid-refrigerant tube 27a to the first intake return tube 29a undergoes heat exchange with the heat-source-side refrigerant and is brought to a subcooled state. The heat-source-side refrigerant that flows through the first intake return tube 29a is returned to the heat-source-side intake tube 21c. The heat-source-side refrigerant cooled in the first subcooler 31a is sent to the heat-source-side liquid-refrigerant junction tube 27 by way of the first heat-source-side liquid-refrigerant tube 27a. A portion of the high-pressure heat-source-side refrigerant sent to the heat-source-side liquid-refrigerant junction tube 27 is sent to the liquid-refrigerant communication tube 13 by way of the liquid-side closing valve 33, and the remainder is sent to the second heat-source-side liquid-refrigerant tube 27b.

The high-pressure heat-source-side refrigerant sent to the discharge refrigerant communication tube 12 is branched into two flows and sent to the usage units 105a, 105b.

The high-pressure heat-source-side refrigerant sent from the discharge refrigerant communication tube 12 to the usage units 105a, 105b is sent to the first usage-side heat exchangers 51a, 51b via the first usage-side gas-refrigerant tubes 54a, 54b, The high-pressure heat-source-side refrigerant sent to the first usage-side heat exchangers 51a, 51b radiates heat in the first usage-side heat exchangers 51a, 51b by exchanging heat with the low-pressure usage-side refrigerant in the refrigeration cycle circulating through the usage-side refrigerant circuits 50a, 50b. The high-pressure heat-source-side refrigerant which has radiated heat in the first usage-side heat exchangers 51a, 51b is sent to the usage-side heat exchange inlet/outlet connection tubes 53a, 53b by way of the first usage-side expansion valves 52a, 52b.

The heat-source-side refrigerant sent to the liquid-refrigerant communication tube 13 is branched into two flows and sent to the usage units 105a, 105b, The high-pressure heat-source-side refrigerant sent from the liquid-refrigerant communication tube 13 to the usage units 105a, 105b is merged in the usage-side heat exchange inlet/outlet connection tubes 53a, 53b with the heat-source-side refrigerant which has radiated heat in the first usage-side heat exchangers 51a, 51b. The heat-source-side refrigerant merged with the usage-side heat exchange inlet/outlet connection tubes 53a, 53b is sent to the second usage-side expansion valves 152a, 152b. The heat-source-side refrigerant sent to the second usage-side expansion valves 152a, 152b is depressurized in the second usage-side expansion valves 152a, 152b to form a low-pressure gas-liquid two-phase state, and is sent to the second usage-side heat exchangers 151a, 151b by way of the usage-side heat exchange inlet/outlet connection tubes 53a, 53b. The low-pressure heat-source-side refrigerant sent to the second usage-side heat exchangers 151a, 151b evaporates in the second usage-side heat exchangers 151a, 151b by exchanging heat with the aqueous medium circulated by the second circulation pumps 171a, 171b through the aqueous medium circuits 70a, 70b. The low-pressure heat-source-side refrigerant evaporated in the. second usage-side heat exchangers 151a, 151b is sent from the usage units 105a, 105b to the intake refrigerant communication tube 14 by way of the usage-side heat exchanger outlet on/off valves 154a, 154b and the second usage-side gas-refrigerant tubes 153a, 153b and is merged.

The low-pressure heat-source-side refrigerant sent to the intake refrigerant communication tube 14 is sent to the heat source unit 2. The low-pressure heat-source-side refrigerant sent to the heat source unit 2. is sent to the intake side closing valve 34 and the heat-source-side gas refrigerant tube 25. The heat-source-side refrigerant sent from the heat-source-side liquid-refrigerant junction tube 27 to the second heat-source-side liquid-refrigerant tube 27b is sent to the second subcooler 31b. The heat-source-side refrigerant sent to the second subcooler 31b is sent to the second heat-source-side expansion valve 28b without undergoing heat exchange because the heat-source-side refrigerant does not flow to the second intake return tube 29b, The heat-source-side refrigerant sent to the second heat-source-side expansion valve 28b is depressurized in the second heat-source-side expansion valve 28b to form a low-pressure gas-liquid two-phase state, and is sent to the second heat-source-side heat exchanger 26b by way of the second heat-source-side liquid-refrigerant tube 27b. The low-pressure heat-source-side refrigerant sent to the second heat-source-side heat exchanger 26b evaporates in the second heat-source-side heat exchanger 26b by exchanging heat with the outdoor air fed by the second heat-source-side fan 36b. The low-pressure heat-source-side refrigerant evaporated in the second heat-source-side heat exchanger 26b is sent to the heat-source-side gas-refrigerant tube 25 by way of the second heat-source-side gas-refrigerant tube 24b, the second heat-source-side switching mechanism 23b, and the communication tube 38, and is merged with the heat-source-side refrigerant sent from the intake refrigerant communication tube 14 to the heat source unit 2. The low-pressure heat-source-side refrigerant merged in the heat-source-side gas-refrigerant tube 25 is again taken into the heat-source-side compressor 21 by way of the heat-source-side intake tube 21c.

On the other hand, in the aqueous medium circuits 70a, 70b, the aqueous medium circulating through the aqueous medium circuits 70a, 70b is cooled by evaporation of the heat-source-side refrigerant in the second usage-side heat exchangers 151a, 151b. The aqueous medium cooled in the second usage-side heat exchangers 151a, 151b is sent by the second circulation pumps 171a, 171b from the usage units 105a, 105b to the aqueous medium communication tubes 16a, 16b by way of the second usage-side water outlet tubes 174a, 174b and the first usage-side water outlet tubes 74a, 74b. The aqueous medium sent to the aqueous medium communication tubes 16a, 16b is sent to the aqueous medium air cooling/warming units 75a, 75b. The aqueous medium sent to the aqueous medium air cooling/warming units 75a, 75b is heated in the heat exchange panels 76a, 76b, whereby the indoor space along the walls or the like is cooled, and the indoor floor is also cooled.

In the aqueous medium circuits 70a, 70b, the aqueous medium circulating through the aqueous medium circuits 70a, 70b is heated by the heat radiation of the heat-source-side refrigerant in the refrigerant/water heat exchangers 57a, 57b. The aqueous medium heated in the refrigerant/water heat exchangers 57a, 57b is fed by the first circulation pumps 71a, 71b to the hot-water storage tanks 161a, 161b by way of the first usage-side water outlet tubes 74a, 74b and the hot-water storage tank-side water inlet tubes 176a, 176b. The heat exchange coils 162a, 162b radiate heat and perform heat exchange with the aqueous medium inside the hot-water storage tanks 161a, 161b to heat the aqueous medium inside the hot-water storage tanks 161a, 161b.

In this manner, operation in the simultaneous air cooling/warming operation mode (mainly heat radiation) for performing a mixed air-cooling and air-warming operation (and/or hot-water supply operation) is performed in a state in which at least one of the usage units 105a, 105b is set to air-cooling/hot-water operation for simultaneously carrying out air-cooling operation and hot-water supply operation.

—Full Air-Cooling Operation Mode—

In the case that only air-cooling operation of the usage units 105a, 105b is to be performed, the first and second heat-source-side switching mechanisms 23a, 23b are switched to the heat-source-side heat-radiation operating state (the state of the first and second heat-source-side switching mechanisms 23a, 23b indicated by the solid lines in FIG. 4) in the heat-source-side refrigerant circuit 20. The third heat-source-side switching mechanism 39 is switched to the simultaneous air-cooling/warming operating state (the state of the third heat-source-side switching mechanism 39 indicated by the solid lines in FIG. 4). The first usage-side expansion valves 52a, 52b are switched to be closed, and the usage-side heat exchanger outlet on/off valves 154a, 154b are opened. The cool/warm water switching mechanisms 175a, 175b are switched to a state in which the aqueous medium cooled in the second usage-side heat exchangers 151a, 151b is fed to the aqueous-medium air-cooling/warming units 75a, 75b. In this description, all of the usage units 5a, 5b are set for air-cooling operation. Here, operation in which all of the usage units 105a, 105b are set for air-cooling is the same as the operation in which all of the usage units 105a, 105b of the first embodiment are set for air-cooling operation. Therefore, a detailed description of the operation in which all of the usage units 105a, 105b are set for air-cooling operation is omitted here.

Operation in the full air-cooling operation mode in which the usage units 105a, 105b perform only air-cooling operation is performed in this manner.

—Switching Operation Modes, and Controlling Heat Load Balance—

As described above, the heat pump system 101 is capable of handling operating states in which the air-cooling operation and/or hot-water supply operation (cooling operation) or the air-warming operation (heating operation) is arbitrarily set for each of the usage units 105a, 105b by switching operating modes. In other words, in a state in which the air-cooling operation or air-warming operation is set for each of the usage units 105a, 105b, the heat pump system 1 causes the first and second heat-source-side heat exchangers 26a, 26b to function as evaporators of the heat-source-side refrigerant or as radiators of the heat-source-side refrigerant in accordance with the heat load of all the usage units 105a, 105b, making it possible to perform operation in which the heat load of all the usage units 105a, 105b is balanced. Here, switching of the operating modes and control of the heat load balance described above is the same as the switching of the operating modes and control of the heat load balance of the first embodiment, except that the air-warming operation mode has hot-water supply operation, and the air-cooling operation mode has hot-water supply operation or air-cooling/hot-water supply operation. Therefore, a detailed description of the switching of the operating modes and control of the heat load balance will be omitted here.

—Controlling the Usage-Side Condensing Temperature, and Setting the Target Usage Side Condensing Temperature and the Target Heat-Source-Side Condensing Temperature—

With the heat pump system 101, the usage-side refrigerant circulating through the usage-side refrigerant circuits 50a, 50b is heated in the first usage-side heat exchangers 51a, 51b by heat radiation of the heat-source-side refrigerant circulating through the heat-source-side refrigerant circuit 20 during the full air-warming operation mode and the simultaneous air cooling/warming operation mode, as described above. The usage-side refrigerant circuits 50a, 50b can achieve a refrigeration cycle having a temperature greater than the refrigeration cycle in the heat-source-side refrigerant circuit 20 by using the heat obtained from the heat-source-side refrigerant. Therefore, a high-temperature aqueous medium can be obtained by heat radiation of the usage-side refrigerant in the refrigerant/water heat exchangers 57a, 57b. At this point, it is preferred that control be performed so that the refrigeration cycle in the heat-source-side refrigerant circuit 20 and the refrigeration cycle in the usage-side refrigerant circuits 50a, 50b are stabilized in order to stably obtain a high-temperature aqueous medium. In view of the above, the controller 101a controls the usage-side condensing temperatures Tc2a, Tc2b in the same manner as in the first embodiment.

Also, at this point, the target heat-source-side condensing temperature Tc1s and the target usage-side condensing temperatures Tc2as, Tc2bs are preferably set in an appropriate fashion in order to obtain the setting temperature of the aqueous medium required in the usage units 105a, 105b. In view of this, the controller 101a sets the target heat-source-side condensing temperature Tc1s and the target usage-side condensing temperatures Tc2as, Tc2bs in the same manner as in the first embodiment.

—Setting the Target Heat-Source-Side Condensing Temperature for the Simultaneous Air Cooling/Warming Operation Mode under Low Outside Air Conditions—

With the heat pump system 101, the heat radiation capability of the heat-source-side heat exchangers functioning as refrigerant radiators tends to increase and the tendency toward reduced operating efficiency become pronounced in the simultaneous air cooling/warming operation mode under low outside air temperature conditions. In view of the above, the controller 101a operates in the same manner as in the first embodiment so as to bring the heat-source-side condensing temperature Tc1 to below 40° C. in the case that the outside air temperature Ta is 25° C. or tower and a mixed air-cooling (cooling) and air-warming (heating) operation is performed (i.e., simultaneous air cooling/warming operation mode).

<Characteristics>

The heat pump system 101 has the following characteristics.

—A—

With the heat pump system 101, the same effects can be obtained as with the heat pump system 1 of the first embodiment (see <Characteristics> of the heat pump system 1 of the first embodiment).

—B—

With the heat pump system 101, the usage units 105a, 105b are capable of simultaneously carrying out air-cooling operation (cooling operation), and air-warming operation or hot-water supply operation (heating operation), Therefore, indoor air cooling by the air-cooling operation, and hot-water supply by hot-water supply operation, for example, can be performed simultaneously. Accordingly, the heat pump system 101 is useful in residential complexes in which hot-water supply and air cooling are performed simultaneously. Also, the heat pump system 101 is useful in hot-water supply applications that require a high-temperature aqueous medium, because operation for heating the aqueous medium to 65° C. or higher can be performed.

<Modification 1>

In order to more efficiently use the air-cooling/hot-water supply operation in the heat pump system 101 (see FIG. 4) described above, the hot-water supply operation (heating operation), i.e., the air-cooling/hot-water supply operation, may be performed in the case that the hot-water storage temperatures Twha, Twhb, which are the temperatures of the aqueous medium stored in the hot-water storage tanks 161a, 161b, has fallen to predetermined hot-water storage temperatures Twhas, Twhbs during the air-cooling operation (cooling operation).

Figure 5:
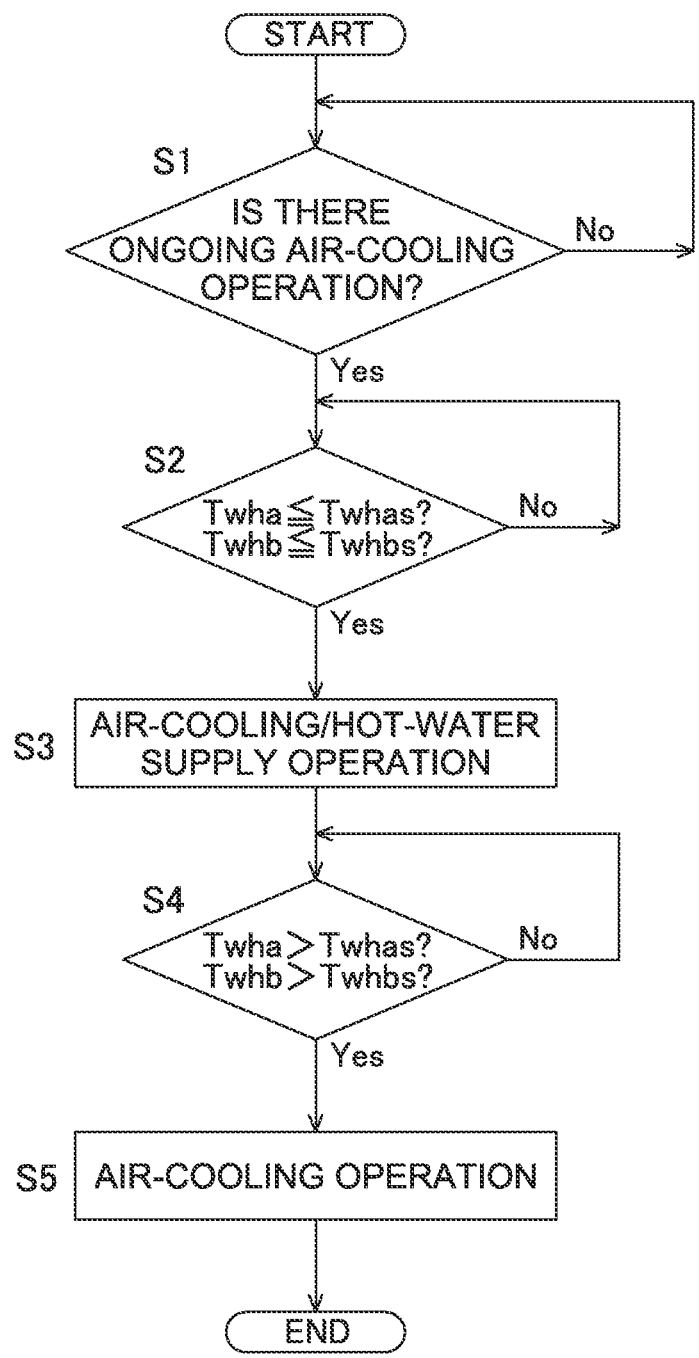
FIG. 5 is a flowchart showing a transition from air-cooling operation to air-cooling hot-water operation according to the modified example 1 of the second embodiment.

For example, it is possible to perform a transition from the air-cooling operation to the air-cooling/hot-water supply operation in accordance with the flowchart shown in FIG. 5.

First, the controller 101a determines whether there is a usage unit present that is performing air-cooling operation among the usage units 105a, 105b (step S1).

The controller 101a then determines (step S2) whether the hot-water storage temperature (in this case, the hot-water storage temperature Twha and/or the hot-water storage temperature Twhb) in the hot-water storage tank of the usage unit for performing the air-cooling operation is equal to or less than a hot-water storage temperature setting (in this case, the hot-water storage temperature setting Twhas and/or the hot-water storage temperature setting Twhbs).

In the case that it is determined in step 52 that a hot-water storage tank is present in which the hot-water storage temperature is equal to or less than the hot-water storage temperature setting, the controller 101a performs (step S3) air-cooling/hot-water supply operation in the usage unit having a hot-water storage tank in which the hot-water storage temperature is equal to or less than the hot-water storage temperature setting.

The controller 101a then determines (step S4) whether the hot-water storage temperature has been brought above the hot-water storage temperature setting by air-cooling/hot-water supply operation.

In the case that it has been determined in step S4 that the hot-water storage temperature has risen above the hot-water storage temperature setting, the controller 101a switches the usage unit to air-cooling operation (step S5).

With the heat pump system 101 of the present modification, the hot-water storage temperatures Twha, Twhb can therefore be kept at the hot-water storage temperature settings Twhas, Twhbs or higher while the heat obtained by the heat-source-side refrigerant can be efficiently used by cooling the aqueous medium in the air-cooling operation. This is because the air-cooling/hot-water supply operation is performed when the hot-water storage temperatures Twha, Twhb are equal to or lower than the hot-water storage temperature settings Twhas, Twhbs. Also, since the transition from the air-cooling operation to the air-cooling/hot-water supply operation can be performed for each of the usage units 105a, 105b, the heat provided to the heat-source-side refrigerant by cooling the aqueous medium in the air-cooling operation is efficiently used in each residence in a residential complex or the like, and energy can be saved.

<Modification 2>

In the heat pump system 101 described above (see FIG. 4), it is possible to control the airflow rate of the heat-source-side fans and to intermittently perform the air-cooling operation (cooling operation) to prevent freezing of the second usage-side heat exchangers 151a, 151b in the same manner as in modifications 1, 2 of the first embodiment.

(3) Other Embodiments

Embodiments of the present invention and modifications thereof were described with reference to the drawings, but specific configurations are not limited to these embodiments and modifications thereof, and it is possible to make modifications within a range that does not depart from the spirit of the invention.

—A—

In the heat pump systems 1, 101 described above, HFC-134a is used as the usage-side refrigerant, but no limitation is imposed thereby; and it is also possible to use, e.g., HFO-1234yf (2,3,3,3-tetrafluoro-1-propene) or another refrigerant in which the pressure that corresponds to a saturated gas temperature of 65° C. is a maximum gauge pressure of 2.8 MPa or less, preferably 2.0 MPa or less.

—B—

Used in the heat pump system 1, 101 described above is a configuration in which a plurality of usage units 5a, 5b having first usage-side heat exchangers 51a, 51b and second usage-side heat exchangers 151a, 151b are connected, but no limitation is imposed thereby, and it is also possible to use a configuration obtained by connecting a plurality of usage units 5a, 5b having first usage-side heat exchangers 51a, 51b and second usage-side heat exchangers 151a, 151b, as well as usage units that do not have second usage-side heat exchangers 151a, 151b.

Industrial Applicability

The present invention can be widely applied to heat pump systems configured by connecting a plurality of usage units for performing an aqueous medium cooling or heating operation to a heat source unit having a plurality of heat-source-side heat exchangers, and the heat pump system being capable of simultaneous cooling and heating operations.

What is claimed is:

1. A heat pump system comprising:
a heat-source-side refrigerant circuit having a plurality of usage units having usage-side heat exchangers, the plurality of usage units being connected to a heat source unit having a plurality of heat-source-side heat exchangers and a heat-source-side compressor configured to compress a heat-source-side refrigerant; and
a controller configured
to cause the plurality of heat-source-side heat exchangers to function as evaporators of heat-source-side refrigerant and radiators of heat-source-side refrigerant, and to carry out an operation to balance the heat load of all of the plurality of usage units, in accordance with the heat load of all of the plurality of usage units, in astute in which a cooling operation or heating operation is set for each of the usage units,
the cooling operation being used to cool an aqueous medium by using the evaporation of the heat-source-side refrigerant in the usage-side heat exchangers, and
the heating operation being used to heat the aqueous medium by using the heat radiation of the heat-source-side refrigerant in the usage-side heat exchangers,
the usage units have usage-side refrigerant circuits having usage-side compressors configured to compress a usage-side refrigerant, the usage-side compressors being connected to refrigerant/water heat exchangers configured to heat an aqueous medium by heat exchange between the usage-side refrigerant and the aqueous medium, the refrigerant/water heat exchangers being configured to function as heat radiators of the usage-side refrigerant, and the usage-side heat exchangers being configured to function as evaporators of the usage-side refrigerant and radiators of the heat-source-side refrigerant,
the controller being further configured to
detect an outside ambient temperature,
detect a state of each usage unit, the state indicating whether the respective usage unit is executing the cooling operation or the heating operation, and
perform control so that a heat-source-side condensing temperature is below 40° C. upon determining that at least one usage unit is executing the cooling operating, at least one usage unit is executing the heating operation, and the outside ambient temperature is equal to or less than 25° C., and
the heat-source-side condensing temperature corresponding to a saturation temperature of the heat-source-side refrigerant in the heat-source-side heat exchangers.

2. The heat pump system according to claim 1, wherein the usage-side heat exchangers have first usage-side heat exchangers that function as an evaporator of the usage-side refrigerant and as a radiator of the heat-source-side refrigerant during the heating operation, and second usage-side heat exchangers configured to cool the aqueous medium by exchanging heat between the heat-source-side refrigerant and the aqueous medium during the cooling operation; and the usage-side refrigerant circuits are configured by connecting the usage-side compressors, the refrigerant/water heat exchangers, and the first usage-side heat exchangers.

3. The heat pump system according to claim 2, wherein the usage units are configured to simultaneously carry out the heating operation to heat the aqueous medium by heat radiation of the heat-source-side refrigerant in the first usage-side heat exchangers and by operation of the usage-side refrigerant circuits, and the cooling operation to cool for cooling the aqueous medium by evaporation of the heat-source-side refrigerant in the second usage-side heat exchangers.

4. The heat pump system according to claim 3, wherein the refrigerant/water heat exchangers are connected to hot-water storage tanks configured to store the aqueous medium heated in the refrigerant/water heat exchangers, or the aqueous medium heated by exchanging heat with the aqueous medium heated in the refrigerant/water heat exchanger; and the controller is further configured to perform the heating operation when hot-water storage temperatures of the aqueous medium stored in the hot-water storage tanks during the cooling operation have reached or fallen below predetermined hot-water storage temperature settings.

5. The heat pump system according to claim 1, wherein the heat-source-side compressor is a variable-capacity compressor;

the controller is further configured to control the operating capacity of the heat-source-side compressor so that the heat-source-side condensing temperature reaches a predetermined target heat-source-side condensing temperature; and the controller is further configured to set the target heat-source-side condensing temperature to below 40° C. when the outside air temperature is 25° C. or lower and the cooling and heating operations coexist.

6. The heat pump system according to claim 5, wherein the heat source unit further has a variable-airflow heat-source-side fan configured to feed air as a cooling source or a heat source for the plurality of heat-source-side heat exchangers; and the controller is further configured to control an operating airflow rate of the heat-source-side fan so that the heat-source-side condensing temperature reaches the target heat-source-side condensing temperature when the outside air temperature is 25° C. or lower and the cooling and heating operations coexist.

7. The heat pump system according to claim 1, wherein the controller is further configured to intermittently perform the cooling operation when the outside air temperature is 10° C. or lower and the cooling and heating operations coexist, heat-source-side heat exchangers that function as evaporators of the heat-source-side refrigerant are present, and the heat-source-side evaporation temperature, which corresponds to the saturation temperature of the heat-source-side refrigerant in the heat-source-side heat exchangers functioning as evaporators of the heat-source-side refrigerant, has reached or fallen below a predetermined lower-limit evaporation temperature.

8. The heat pump system according to claim 1, wherein usage-side heat exchanger outlet on-off valves, which are closed when the cooling operation is not being performed and are opened when the cooling operation is being performed, are provided to outlets of the usage-side heat exchangers carrying the heat-source-side refrigerant during the cooling operation.

9. The heat pump system according to claim 1, wherein the heat-source-side refrigerant circuit and the controller are configured such that the aqueous medium can be heated to 65° C. or higher during the heating operation.

* * * * *